(12) United States Patent
Pekrul

(10) Patent No.: US 8,360,760 B2
(45) Date of Patent: Jan. 29, 2013

(54) ROTARY ENGINE VANE WING APPARATUS AND METHOD OF OPERATION THEREFOR

(76) Inventor: Merton W. Pekrul, Mesa, AZ (US)

( * ) Notice: Subject to any disclaimer, the term of this patent is extended or adjusted under 35 U.S.C. 154(b) by 0 days.

(21) Appl. No.: 13/053,022

(22) Filed: Mar. 21, 2011

(65) Prior Publication Data

US 2011/0168127 A1    Jul. 14, 2011

Related U.S. Application Data

(63) Continuation-in-part of application No. 13/042,744, filed on Mar. 8, 2011, which is a continuation-in-part of application No. 13/031,228, filed on Feb. 20, 2011, and a continuation-in-part of application No. 13/031,190, filed on Feb. 19, 2011, and a (Continued)

(51) Int. Cl.
*F01C 21/00* (2006.01)
*F01C 19/00* (2006.01)
(52) U.S. Cl. .......... 418/82; 418/109; 418/146; 418/148; 418/184; 418/185; 418/268
(58) Field of Classification Search ............. 418/82, 418/107–109, 111, 113, 145–149, 184–188, 418/268–269
See application file for complete search history.

(56) References Cited

U.S. PATENT DOCUMENTS

| | | | |
|---|---|---|---|
| 122,713 A | 1/1872 | Faucett | |
| 1,953,378 A | 4/1934 | Vias | |
| 2,545,238 A * | 3/1951 | MacMillin et al. | ............ 418/268 |
| 2,588,342 A | 3/1952 | Bidwell | |
| 2,778,317 A * | 1/1957 | Cockburn | ......... 418/78 |
| 3,183,843 A | 5/1965 | Cockburn | |
| 3,237,528 A | 3/1966 | Rose | |
| 3,295,752 A | 1/1967 | Bellmer | |
| 3,381,891 A | 5/1968 | Bellmer | |
| 3,450,108 A * | 6/1969 | Rich | ............... 418/92 |
| 3,516,769 A | 6/1970 | Korhonen | |
| 3,539,281 A | 11/1970 | Kramer | |
| 3,585,973 A | 6/1971 | Klover | |
| 3,809,020 A | 5/1974 | Takitani | |
| 3,883,277 A | 5/1975 | Keller | |
| 3,915,598 A | 10/1975 | Kalen | |
| 3,950,950 A | 4/1976 | Doerner | |
| 3,958,422 A | 5/1976 | Kelly | |
| 3,970,051 A | 7/1976 | Kirkman | |
| 3,975,914 A | 8/1976 | Tufts | |
| 3,976,037 A | 8/1976 | Hojnowski | |
| 3,986,483 A | 10/1976 | Larson | |
| 4,005,951 A | 2/1977 | Swinkels | |
| 4,033,299 A | 7/1977 | Manzoni | |
| 4,033,300 A | 7/1977 | Larson | |
| 4,046,493 A | 9/1977 | Alund | |

(Continued)

*Primary Examiner* — Hoang Nguyen
(74) *Attorney, Agent, or Firm* — Kevin Hazen

(57) ABSTRACT

A rotary apparatus is described having: a vane; a rotor comprising a center, the rotor configured to carry the vane; and a housing, the rotor operatively mounted within the housing. The vane includes: a central vane axis extending longitudinally through the vane along a y-axis, the y-axis comprising a line from the center of the rotor to the housing, and a vane end intersecting the y-axis, the vane end proximate an inner surface of said housing. The vane end of the vane further includes a vane extension protruded radially outward from about the vane end along an x-axis about perpendicular to the y-axis, the vane extension comprising at least one aperture therethrough. During operation of the rotary apparatus, fuel flows through the aperture reducing pressure between a portion of the vane extension and the housing, which facilitates vane sealing to the housing and improves efficiency by reducing engine chatter.

17 Claims, 20 Drawing Sheets

Related U.S. Application Data continuation-in-part of application No. 13/041,368, filed on Mar. 5, 2011, which is a continuation-in-part of application No. 13/031,755, filed on Feb. 22, 2011, which is a continuation-in-part of application No. 13/014,167, filed on Jan. 26, 2011, which is a continuation-in-part of application No. 12/705,731, filed on Feb. 15, 2010, which is a continuation of application No. 11/388,361, filed on Mar. 24, 2006, now Pat. No. 7,694,520, which is a continuation-in-part of application No. 11/077,289, filed on Mar. 9, 2005, now Pat. No. 7,055,327.

(60) Provisional application No. 61/304,462, filed on Feb. 14, 2010, provisional application No. 61/311,319, filed on Mar. 6, 2010, provisional application No. 61/316,164, filed on Mar. 22, 2010, provisional application No. 61/316,241, filed on Mar. 22, 2010, provisional application No. 61/316,718, filed on Mar. 23, 2010, provisional application No. 61/323,138, filed on Apr. 12, 2010, provisional application No. 61/330,355, filed on May 2, 2010.

(56) References Cited

U.S. PATENT DOCUMENTS

| | | |
|---|---|---|
| 4,047,856 A | 9/1977 | Hoffman |
| 4,064,841 A | 12/1977 | Jenkins |
| 4,106,472 A | 8/1978 | Rusk |
| 4,115,045 A | 9/1978 | Wyman |
| 4,132,512 A | 1/1979 | Roberts |
| 4,168,941 A | 9/1979 | Rettew |
| 4,178,900 A | 12/1979 | Larson |
| 4,191,032 A | 3/1980 | August |
| 4,203,410 A | 5/1980 | Ramer |
| 4,242,065 A | 12/1980 | Ishizuka |
| 4,290,268 A | 9/1981 | Lowther |
| 4,353,337 A | 10/1982 | Rosaen |
| 4,355,965 A | 10/1982 | Lowther |
| 4,367,629 A | 1/1983 | Cann |
| 4,399,863 A | 8/1983 | Banasiuk |
| 4,437,308 A | 3/1984 | Fischer |
| 4,486,158 A | 12/1984 | Maruyama |
| 4,492,541 A | 1/1985 | Mallen-Herrero |
| 4,515,123 A | 5/1985 | Taylor |
| 4,548,171 A | 10/1985 | Larson |
| 4,580,950 A | 4/1986 | Sumikawa |
| 4,638,776 A | 1/1987 | Crittenden |
| 4,721,079 A | 1/1988 | Lien |
| 4,760,701 A | 8/1988 | David |
| 4,792,295 A * | 12/1988 | Joyce, Sr. ............... 418/31 |
| 4,804,317 A | 2/1989 | Smart |
| 4,813,388 A | 3/1989 | Yang |
| 4,817,567 A | 4/1989 | Wilks |
| 4,860,704 A | 8/1989 | Slaughter |
| 5,039,290 A | 8/1991 | Nardi |
| 5,116,208 A | 5/1992 | Parme |
| 5,181,844 A | 1/1993 | Bishop |
| 5,224,850 A | 7/1993 | Pie |
| 5,235,945 A | 8/1993 | Testea |
| 5,277,158 A | 1/1994 | Pangman |
| 5,336,047 A | 8/1994 | Kolhouse |
| 5,359,966 A | 11/1994 | Jensen |
| 5,379,736 A | 1/1995 | Anderson |
| 5,408,824 A | 4/1995 | Schlote |
| 5,419,691 A | 5/1995 | Lien |
| 5,501,586 A | 3/1996 | Edwards |
| 5,524,587 A | 6/1996 | Mallen |
| 5,540,199 A | 7/1996 | Penn |
| 5,558,511 A | 9/1996 | Hedelin |
| 5,567,139 A | 10/1996 | Weatherston |
| 5,571,005 A | 11/1996 | Stoll |
| 5,571,244 A | 11/1996 | Andres |
| 5,634,783 A | 6/1997 | Beal |
| 5,681,153 A | 10/1997 | Weatherston |
| 5,720,251 A | 2/1998 | Round |
| 5,755,196 A | 5/1998 | Klassen |
| 5,758,501 A | 6/1998 | Jirnov |
| 5,794,583 A | 8/1998 | Ichieda |
| 5,937,820 A | 8/1999 | Nagata |
| 5,946,916 A | 9/1999 | Ven |
| 5,968,378 A | 10/1999 | Jensen |
| 6,006,009 A | 12/1999 | Friedheim |
| 6,036,463 A | 3/2000 | Klassen |
| 6,070,565 A | 6/2000 | Miniere |
| 6,086,347 A | 7/2000 | Ryska |
| 6,106,255 A | 8/2000 | Viegas |
| 6,164,263 A | 12/2000 | Saint-Hilaire |
| 6,169,852 B1 | 1/2001 | Liao |
| 6,247,443 B1 | 6/2001 | Pelleja |
| 6,354,262 B2 | 3/2002 | Wade |
| 6,364,646 B1 | 4/2002 | Kirtley |
| 6,497,557 B2 | 12/2002 | Aden |
| 6,530,211 B2 | 3/2003 | Holtzapple |
| 6,546,908 B1 | 4/2003 | Pekau |
| 6,565,310 B1 | 5/2003 | Davidow |
| 6,589,033 B1 | 7/2003 | Johnson |
| 6,594,997 B2 | 7/2003 | Romanelli |
| 6,601,570 B2 | 8/2003 | Zetmeir |
| 6,634,873 B2 | 10/2003 | Klassen |
| 6,659,065 B1 | 12/2003 | Renegar |
| 6,722,182 B1 | 4/2004 | Buettner |
| 6,729,296 B2 | 5/2004 | King |
| 6,739,852 B1 | 5/2004 | Klassen |
| 6,772,728 B2 | 8/2004 | Al-Hawaj |
| 6,773,226 B2 | 8/2004 | Al-Hawaj |
| 6,786,036 B2 | 9/2004 | Kight |
| 6,799,549 B1 | 10/2004 | Patterson |
| 6,886,527 B2 | 5/2005 | Regev |
| 6,899,075 B2 | 5/2005 | Saint-Hilaire |
| 7,073,477 B2 | 7/2006 | Gorski |
| 7,255,083 B2 | 8/2007 | Hamada |
| 7,341,041 B2 | 3/2008 | Pekau |
| 7,395,805 B1 | 7/2008 | MacMurray |
| 7,412,831 B2 | 8/2008 | Ullyott |
| 7,578,278 B2 | 8/2009 | Peitzke |
| 7,674,101 B2 | 3/2010 | Maeng |
| 7,707,987 B2 | 5/2010 | Guthrie |
| 7,713,042 B1 | 5/2010 | Rodgers |
| 7,845,332 B2 | 12/2010 | Wang |
| 2006/0102139 A1 | 5/2006 | Garcia |
| 2008/0041056 A1 | 2/2008 | Carnahan |

* cited by examiner

ROTARY ENGINE VANE WING APPARATUS AND METHOD OF OPERATION THEREFOR

CROSS-REFERENCES TO RELATED APPLICATIONS

This application is a continuation-in-part of U.S. patent application Ser. No. 13/042,744 filed Mar. 8, 2011, which:
is a continuation-in-part of U.S. patent application Ser. No. 13/031,228 filed Feb. 20, 2011;
is a continuation-in-part of U.S. patent application Ser. No. 13/031,190 filed Feb. 19, 2011;
is a continuation-in-part of U.S. patent application Ser. No. 13/041,368 filed Mar. 5, 2011, which is a continuation-in-part of U.S. patent application Ser. No. 13/031,755 filed Feb. 22, 2011, which is a continuation-in-part of U.S. patent application Ser. No. 13/014,167 filed Jan. 26, 2011, which
is a continuation-in-part of U.S. patent application Ser. No. 12/705,731 filed Feb. 15, 2010, which is a continuation of U.S. patent application Ser. No. 11/388,361 filed Mar. 24, 2006, now U.S. Pat. No. 7,694,520, which is a continuation-in-part of U.S. patent application Ser. No. 11/077,289 filed Mar. 9, 2005, now U.S. Pat. No. 7,055,327;
claims the benefit of U.S. provisional patent application No. 61/304,462 filed Feb. 14, 2010;
claims the benefit of U.S. provisional patent application No. 61/311,319 filed Mar. 6, 2010;
claims the benefit of U.S. provisional patent application No. 61/316,164 filed Mar. 22, 2010;
claims the benefit of U.S. provisional patent application No. 61/316,241 filed Mar. 22, 2010;
claims the benefit of U.S. provisional patent application No. 61/316,718 filed Mar. 23, 2010;
claims the benefit of U.S. provisional patent application No. 61/323,138 filed Apr. 12, 2010; and
claims the benefit of U.S. provisional patent application No. 61/330,355 filed May 2, 2010,
all of which are incorporated herein in their entirety by this reference thereto.

TECHNICAL FIELD OF THE INVENTION

The present invention relates to the field of rotary engines. More specifically, the present invention relates to the field of rotary engines having sliding vanes, where the vanes have one or more extensions or wings.

BACKGROUND OF THE INVENTION

The controlled expansion of gases forms the basis for the majority of non-electrical rotational engines in use today. These engines include reciprocating, rotary, and turbine engines, and may be driven by heat, such as with heat engines, or other forms of energy. Heat engines optionally use combustion, solar, geothermal, nuclear, and/or forms of thermal energy. Further, combustion-based heat engines optionally utilize either an internal or an external combustion system, which are further described infra.

Internal Combustion Engines

Internal combustion engines derive power from the combustion of a fuel within the engine itself. Typical internal combustion engines include reciprocating engines, rotary engines, and turbine engines.

Internal combustion reciprocating engines convert the expansion of burning gases, such as an air-fuel mixture, into the linear movement of pistons within cylinders. This linear movement is subsequently converted into rotational movement through connecting rods and a crankshaft. Examples of internal combustion reciprocating engines are the common automotive gasoline and diesel engines.

Internal combustion rotary engines use rotors and chambers to more directly convert the expansion of burning gases into rotational movement. An example of an internal combustion rotary engine is a Wankel engine, which utilizes a triangular rotor that revolves in a chamber, instead of pistons within cylinders. The Wankel engine has fewer moving parts and is generally smaller and lighter, for a given power output, than an equivalent internal combustion reciprocating engine.

Internal combustion turbine engines direct the expansion of burning gases against a turbine, which subsequently rotates. An example of an internal combustion turbine engine is a turboprop aircraft engine, in which the turbine is coupled to a propeller to provide motive power for the aircraft.

Internal combustion turbine engines are often used as thrust engines, where the expansion of the burning gases exit the engine in a controlled manner to produce thrust. An example of an internal combustion turbine/thrust engine is the turbofan aircraft engine, in which the rotation of the turbine is typically coupled back to a compressor, which increases the pressure of the air in the air-fuel mixture and increases the resultant thrust.

All internal combustion engines suffer from poor efficiency; only a small percentage of the potential energy is released during combustion as the combustion is invariably incomplete. Of energy released in combustion, only a small percentage is converted into rotational energy while the rest is dissipated as heat.

If the fuel used in an internal combustion engine is a typical hydrocarbon or hydrocarbon-based compound, such as gasoline, diesel oil, and/or jet fuel, then the partial combustion characteristic of internal combustion engines causes the release of a range of combustion by-product pollutants into the atmosphere via an engine exhaust. To reduce the quantity of pollutants, a support system including a catalytic converter and other apparatus is typically necessitated. Even with the support system, a significant quantity of pollutants are released into the atmosphere as a result of incomplete combustion when using an internal combustion engine.

Because internal combustion engines depend upon the rapid and explosive combustion of fuel within the engine itself, the engine must be engineered to withstand a considerable amount of heat and pressure. These are drawbacks that require a more robust and more complex engine compared to external combustion engines of similar power output.

External Combustion Engines

External combustion engines derive power from the combustion of a fuel in a combustion chamber separate from the engine. A Rankine-cycle engine typifies a modern external combustion engine. In a Rankine-cycle engine, fuel is burned in the combustion chamber and used to heat a liquid at substantially constant pressure. The liquid is vaporized to a gas, which is passed into the engine where it expands. The desired rotational energy and/or power is derived from the expansion energy of the gas. Typical external combustion engines also include reciprocating engines, rotary engines, and turbine engines, described infra.

External combustion reciprocating engines convert the expansion of heated gases into the linear movement of pistons within cylinders and the linear movement is subsequently converted into rotational movement through linkages.

A conventional steam locomotive engine is used to illustrate functionality of an external combustion open-loop Rankine-cycle reciprocating engine. Fuel, such as wood, coal, or oil, is burned in a combustion chamber or firebox of the locomotive and is used to heat water at a substantially constant pressure. The water is vaporized to a gas or steam form and is passed into the cylinders. The expansion of the gas in the cylinders drives the pistons. Linkages or drive rods transform the piston movement into rotary power that is coupled to the wheels of a locomotive and is used to propel the locomotive down the track. The expanded gas is released into the atmosphere in the form of steam.

External combustion rotary engines use rotors and chambers instead of pistons, cylinders, and linkages to more directly convert the expansion of heated gases into rotational movement.

External combustion turbine engines direct the expansion of heated gases against a turbine, which then rotates. A modern nuclear power plant is an example of an external-combustion closed-loop Rankine-cycle turbine engine. Nuclear fuel is consumed in a combustion chamber known as a reactor and the resultant energy release is used to heat water. The water is vaporized to a gas, such as steam, which is directed against a turbine forcing rotation. The rotation of the turbine drives a generator to produce electricity. The expanded steam is then condensed back into water and is typically made available for reheating.

With proper design, external combustion engines are more efficient than corresponding internal combustion engines. Through the use of a combustion chamber, the fuel is more thoroughly consumed, releasing a greater percentage of the potential energy. Further, more thorough consumption means fewer combustion by-products with a corresponding reduction in pollutants.

Because external combustion engines do not themselves encompass the combustion of fuel, they are optionally engineered to operate at a lower pressure and a lower temperature than comparable internal combustion engines, which allows the use of less complex support systems, such as cooling and exhaust systems. The result is external combustion engines that are simpler and lighter for a given power output compared with internal combustion engines.

External Combustion Engine Types
Turbine Engines

Typical turbine engines operate at high rotational speeds. The high rotational speeds present several engineering challenges that typically result in specialized designs and materials, which adds to system complexity and cost. Further, to operate at low-to-moderate rotational speeds, turbine engines typically utilize a step-down transmission of some sort, which again adds to system complexity and cost.

Reciprocating Engines

Similarly, reciprocating engines require linkages to convert linear motion to rotary motion resulting in complex designs with many moving parts. In addition, the linear motion of the pistons and the motions of the linkages produce significant vibration, which results in a loss of efficiency and a decrease in engine life. To compensate, components are typically counterbalanced to reduce vibration, which again increases both design complexity and cost.

Heat Engines

Typical heat engines depend upon the diabatic expansion of a gas. That is, as the gas expands, it loses heat. This diabatic expansion represents a loss of energy.

Patents and patent applications related to the current invention are summarized here.

Rotary Engine Types

J. Faucett, "Improvement in Rotary Engines", U.S. Pat. No. 122,713 (Jan. 16, 1872) describes a class of rotary steam engines using a revolving disk instead of a piston. Particularly, the engine uses a pair of oval concentrics secured to a single transverse shaft, each revolving within a separate steam chamber.

L. Kramer, "Sliding-Vane Rotary Fluid Displacement Machine", U.S. Pat. No. 3,539,281 (Nov. 10, 1970) describes a sliding-vane rotary fluid displacement machine having a rotor carrying a plurality of sliding vanes that positively move outward as the rotor rotates. The rotor and vanes are surrounded by a cylinder that rotates with the rotor and vanes about an axis.

R. Hoffman, "Rotary Steam Engine", U.S. Pat. No. 4,047,856 (Sep. 13, 1977) describes a unidirectional rotary steam power unit using a power fluid supplied through a hollow rotor and is conducted to working chambers using passages in walls of the housing controlled by seal means carried by the rotor.

D. Larson, "Rotary Internal Combustion Engine", U.S. Pat. No. 4,178,900 (Dec. 18, 1979) describes a rotary internal combustion engine configured with a stator and two pairs of sockets. Wedges are affixed to each socket. Rotation of an inner rotor, the sides of the rotor defining a cam, allows pivoting of the wedges, which alters chamber sizes between the rotor and the stator.

J. Ramer, "Method for Operating a Rotary Engine", U.S. Pat. No. 4,203,410 (May 20, 1980) describes a rotary engine having a pair of spaced coaxial rotors in a housing, each rotor rotating separate rotor chambers. An axially extending chamber in the housing communicates the rotor chambers.

F. Lowther, "Vehicle Braking and Kinetic Energy Recovery System", U.S. Pat. No. 4,290,268 (Sep. 22, 1981) describes an auxiliary kinetic energy recovery system incorporating a rotary sliding vane engine and/or compressor, using compressed air or electrical energy recovered from the kinetic energy of the braking system, with controls including the regulation of the inlet aperture.

O. Rosaen, "Rotary Engine", U.S. Pat. No. 4,353,337 (Oct. 12, 1982) describes a rotary internal combustion engine having an elliptically formed internal chamber, with a plurality of vane members slidably disposed within the rotor, constructed to ensure a sealing engagement between the vane member and the wall surface.

J. Herrero, et.al., "Rotary Electrohydraulic Device With Axially Sliding Vanes", U.S. Pat. No. 4,492,541 (Jan. 8, 1985) describes a rotary electrohydraulic device applicable as a braking or slackening device.

O. Lien, "Rotary Engine", U.S. Pat. No. 4,721,079 (Jan. 26, 1988) describes a rotary engine configured with rotors, forming opposite sides of the combustion chambers, rotated on an angled, non-rotatable shaft through which a straight power shaft passes.

K. Yang, "Rotary Engine", U.S. Pat. No. 4,813,388 (Mar. 21, 1989) describes an engine having a pair of cylindrical hubs interleaved in a mesh type rotary engine, each of the cylindrical hubs defining combustion and expansion chambers.

A. Nardi, "Rotary Expander", U.S. Pat. No. 5,039,290 (Aug. 13, 1991) describes a positive displacement single expansion steam engine having cylinder heads fixed to a wall of the engine, a rotatable power shaft having a plurality of nests, and a free-floating piston in each nest.

G. Testea, et.al., "Rotary Engine System", U.S. Pat. No. 5,235,945 (Aug. 17, 1993) describes an internal combustion rotary engine having an offset rotor for rotation about an axis eccentric to a central axis of a cylindrical cavity that provides the working chambers of the engine.

R. Weatherston, "Two Rotor Sliding Vane Compressor", U.S. Pat. No. 5,681,153 (Oct. 28, 1997) describes a two-rotor sliding member rotary compressor including an inner rotor, an outer rotor eccentric to the inner rotor, and at least three sliding members between the inner rotor and the outer rotor.

G. Round, et.al., "Rotary Engine and Method of Operation", U.S. Pat. No. 5,720,251 (Feb. 24, 1998) describes a rotary engine having an inner rotor and an outer rotor with the outer rotor being offset from the inner rotor. The outer rotor is configured with inward projecting lobes forming seals with outward extending radial arms of the inner rotor, the lobes and arms forming chambers of the engine.

J. Klassen, "Rotary Positive Displacement Engine", U.S. Pat. No. 5,755,196 (May 26, 1998) describes an engine having a pair of rotors both housed within a single housing, where each rotor is mounted on an axis extending through a center of the housing, where the rotors interlock with each other to define chambers, where a contact face of a first rotor is defined by rotation of a conical section of a second rotor of the two rotors, such that there is a constant linear contact between opposing vanes on the two rotors.

M. Ichieda, "Side Pressure Type Rotary Engine", U.S. Pat. No. 5,794,583 (Aug. 18, 1998) describes a side pressure type rotary engine configured with a suction port and an exhaust port. A suction blocking element and exhaust blocking element are timed for movement and use in synchronization with rotor rotation to convert expansive forces into a rotational force.

R. Saint-Hilaire, et.al. "Quasiturbine Zero Vibration-Continuous Combustion Rotary Engine Compressor or Pump", U.S. Pat. No. 6,164,263 (Dec. 26, 2000) describe a rotary engine using four degrees of freedom, where an assembly of four carriages, supporting pivots of four pivoting blades, forms a variable shape rotor.

J. Pelleja, "Rotary Internal Combustion Engine and Rotary Internal Combustion Engine Cycle", U.S. Pat. No. 6,247,443 B1 (Jun. 19, 2001) describes an internal combustion rotary engine configured with a set of push rod vanes arranged in a staggered and radial arrangement relative to a drive shaft of the engine.

R. Pekau, "Variable Geometry Toroidal Engine", U.S. Pat. No. 6,546,908 B1 (Apr. 15, 2003) describes a rotary engine including a single toroidal cylinder and a set of pistons on a rotating circular piston assembly where the pistons are mechanically extendable and retractable in synchronization with opening and closing of a disk valve.

M. King, "Variable Vane Rotary Engine", U.S. Pat. No. 6,729,296 B2 (May 4, 2004) describes a rotary engine including: (1) a concentric stator sandwiched between a front wall and an aft wall enclosing a cylindrical inner space and (2) a network of combustors stationed about the periphery of the stator.

O. Al-Hawaj, "Supercharged Radial Vane Rotary Device", U.S. Pat. No. 6,772,728 B2 (Aug. 10, 2004) describes two and four phase internal combustion engines having a doughnut shaped rotor assembly with an integrated axial pump portion.

M. Kight, "Bimodal Fan, Heat Exchanger and Bypass Air Supercharging for Piston or Rotary Driven Turbine", U.S. Pat. No. 6,786,036 B2 (Sep. 7, 2004) describes a turbine for aircraft use where the turbine includes a heat exchanger with minimal drag for increasing the engine effectiveness through an enthalpy increase on the working fluid.

S. Wang, "Rotary Engine with Vanes Rotatable by Compressed Gas Injected Thereon", U.S. Pat. No. 7,845,332 B2 (Dec. 7, 2010) describes a planetary gear rotary engine for internal combustion, where a rotor rotates within an outer shell. With a given rotation of the rotor, vanes drive a power generating unit.

Ignition

E. Pangman, "Multiple Vane Rotary Internal Combustion Engine", U.S. Pat. No. 5,277,158 (Jan. 11, 1994) describes a rotary engine having a fuel ignition system provided to more than one combustion chamber at a time by expanding gases passing through a plasma bleed-over groove. Further exhaust gases are removed by a secondary system using a venturi creating negative pressure.

End Plates

S. Smart, et.al., "Rotary Vane Pump With Floating Rotor Side Plates", U.S. Pat. No. 4,804,317 (Feb. 14, 1989) describes a rotary vane pump having a rotor within a cavity, a pair of stationary wear plates on the sides of the cavity, carbon composite vanes riding in the rotor and a pair of carbon composite rotor side plates positioned between one side of the rotor and the stationary end plates, the vanes having sufficient width to extend into slots of both side plates to drive the side plates with the rotor during operation.

Rotors

F. Bellmer, "Multi-Chamber Rotary Vane Compressor", U.S. Pat. No. 3,381,891 (May 7, 1968) describes a rotary sliding vane compressor having multiple compression chambers circumferentially spaced within the rotor housing with groups of chambers serially connected to provide pressure staging.

Y. Ishizuka, et.al., "Sliding Vane Compressor with End Face Inserts or Rotor", U.S. Pat. No. 4,242,065 (Dec. 30, 1980) describes a sliding vane compressor having a rotor, the rotor having axial endfaces, which are juxtaposed. The axial rotor endfaces having a material of higher thermal coefficient of expansion than a material of the rotor itself, the thermal expansion of the endfaces used to set a spacing.

T. Edwards, "Non-Contact Rotary Vane Gas Expanding Apparatus", U.S. Pat. No. 5,501,586 (Mar. 26, 1991) describes a non-contact rotary vane gas expanding apparatus having a stator housing, a rotor, a plurality of vanes in radial slots of the rotor, a plurality of gas receiving pockets in the rotor adjacent to the radial slots of the rotor, and formations in the stator housing to effectuate transfer of gas under pressure through the stator housing to the gas receiving pockets.

J. Minier, "Rotary Internal Combustion Engine", U.S. Pat. No. 6,070,565 (Jun. 6, 2000) describes an internal combustion engine apparatus containing a slotted yoke positioned for controlling the sliding of vane blades.

Vanes

H. Kalen, et.al., "Rotary Machines of the Sliding Vane Type Having Interconnected Vane Slots", U.S. Pat. No. 3,915,598 (Oct. 28, 1975) describe a rotary machine of the sliding-vane type having a stator housing and a rotor operatively mounted therein, the rotor having vane slots to accommodate sliding vanes with a series of channels in the rotor body interconnecting the vane slots.

R. Jenkins, et.al., "Rotary Engine", U.S. Pat. No. 4,064,841 (Dec. 27, 1977) describes a rotary engine having a stator, an offset, a track in the rotor, and roller vanes running in the track, where each vane extends outward to separate the rotor/stator gap into chambers.

R. Roberts, et.al., "Rotary Sliding Vane Compressor with Magnetic Vane Retractor", U.S. Pat. No. 4,132,512 (Jan. 2, 1979) describes a rotary sliding vane compressor having magnetic vane retractor means to control the pumping capacity of the compressor without the use of an on/off clutch in the drive system.

D. August, "Rotary Energy-Transmitting Mechanism", U.S. Pat. No. 4,191,032 (Mar. 4, 1980) describes a rotary energy-transmitting device configured with a stator, an inner rotor, and vanes separating the stator and rotor into chambers, where the vanes each pivot on a rolling ball mechanism, the ball mechanisms substantially embedded in the rotor.

J. Taylor, "Rotary Internal Combustion Engine", U.S. Pat. No. 4,515,123 (May 7, 1985) describes a rotary internal combustion engine, which provides spring-loaded vanes seated opposed within a cylindrical cavity in which a rotary transfer valve rotates on a shaft.

S. Sumikawa, et.al. "Sliding-vane Rotary Compressor for Automotive Air Conditioner", U.S. Pat. No. 4,580,950 (Apr. 8, 1986) describe a sliding-vane rotary compressor utilizing a control valve constructed to actuate in immediate response to a change in pressure of a fluid to be compressed able to reduce the flow of the fluid when the engine rate is high.

W. Crittenden, "Rotary Internal Combustion engine", U.S. Pat. No. 4,638,776 (Jan. 27, 1987) describes a rotary internal combustion engine utilizing a radial sliding vane on an inner surface of an eccentric circular chamber, and an arcuate transfer passage communicating between the chambers via slots in the rotors adjacent the vanes.

R. Wilks, "Rotary Piston Engine", U.S. Pat. No. 4,817,567 (Apr. 4, 1989) describes a rotary piston engine having a pear-shaped piston, with a piston vane, and four spring-loaded vanes mounted for reciprocal movement.

J. Bishop, et.al., "Rotary Vane Pump With Carbon/Carbon Vanes", U.S. Pat. No. 5,181,844 (Jan. 26, 1993) describes a rotary sliding vane pump having vanes fabricated from a carbon/carbon based material that is optionally teflon coated.

K. Pie, "Rotary Device with Vanes Composed of Vane Segments", U.S. Pat. No. 5,224,850 (Jul. 6, 1993) describes a rotary engine having multipart vanes between an inner rotor and an outer housing, where each vane has end parts and an intermediate part. In a first embodiment, the intermediate part and end part have cooperating inclined ramp faces, such that an outwardly directed force applied to the vane or by a biasing spring causes the end parts to thrust laterally via a wedging action. In a second embodiment, the end parts and intermediate part are separated by wedging members, located in the intermediate portion, acting on the end parts.

S. Anderson, "Gas Compressor/Expander", U.S. Pat. No. 5,379,736 (Jan. 10, 1995) describes an air compressor and gas expander having an inner rotor, an outer stator, and a set of vanes, where each vanes independently rotates, along an axis parallel to an axis of rotation of the rotor, to separate a space between the rotor and stator into chambers.

B. Mallen, et.al., "Sliding Vane Engine", U.S. Pat. No. 5,524,587 (Jun. 11, 1996) describes a sliding vane engine including: a stator and a rotor in relative rotation and vanes containing pins that extend into a pin channel for controlling sliding motion of the vanes.

J. Penn, "Radial Vane Rotary Engine", U.S. Pat. No. 5,540,199 (Jul. 30, 1996) describes a radial vane rotary engine having an inner space with a substantially constant distance between an inner cam and an outer stator, where a set of fixed length vanes separate the inner space into chambers. The inner rotating cam forces movement of each vane to contact the outer stator during each engine cycle.

L. Hedelin, "Sliding Vane Machine Having Vane Guides and Inlet Opening Regulation", U.S. Pat. No. 5,558,511 (Sep. 24, 1996) describes a sliding vane machine with a cylindrical rotor placed in a housing, the rotor being rotatably mounted in the housing at one point and being provided with a number of vanes, where movement of the vanes is guided along a guide race in the housing.

K. Kirtley, et.al., "Rotary Vane Pump With Continuous Carbon Fiber Reinforced PolyEtherEtherKetone (PEEK) Vanes", U.S. Pat. No. 6,364,646 B1 (Apr. 2, 2002) describes a rotary paddle pump with sliding vanes and a stationary side wall, where the vanes and side wall are fabricated using a continuous carbon-fiber reinforced polyetheretherketone material, having self-lubrication properties.

R. Davidow, "Steam-Powered Rotary Engine", U.S. Pat. No. 6,565,310 B1 (May 20, 2003) describes a steam-powered rotary engine having a rotor arm assembly and an outer ring, where steam ejected from an outer end of the rotor arm assembly impacts at essentially right angle onto steps in the outer ring causing the rotor arm to rotate in a direction opposite the direction of travel of the exiting steam.

D. Renegar, "Flexible Vane Rotary Engine", U.S. Pat. No. 6,659,065 B1 (Dec. 9, 2003) describes an internal combustion rotary engine comprising a rotor spinning in an oval cavity and flexible vanes, defining four chambers, that bend in response to cyclical variation in distance between the rotor and an inner wall of a housing of the rotary engine.

R. Saint-Hilaire, et.al., "Quasiturbine (Qurbine) Rotor with Central Annular Support and Ventilation", U.S. Pat. No. 6,899,075 B2 (May 31, 2005) describe a quasiturbine having a rotor arrangement peripherally supported by four rolling carriages, the carriages taking the pressure load of pivoting blades forming the rotor and transferring the load to the opposite internal contoured housing wall. The pivoting blades each include wheel bearing rolling on annular tracks attached to the central area of the lateral side covers forming part of the stator casing.

T. Hamada, et.al. "Sliding Structure for Automotive Engine", U.S. Pat. No. 7,255,083 (Aug. 14, 2007) describe an automotive engine having a sliding portion, such as a rotary vane, where the sliding portion has a hard carbon film formed on the base of the sliding portion.

S. MacMurray, "Single Cycle Elliptical Rotary Engine", U.S. Pat. No. 7,395,805 B1 (Jul. 8, 2008) describes a rotary engine configured a rotor housing having a bisected, offset elliptical interior wall a rotor member disposed therein. Four vanes rotate with the rotor. The rotor vanes are forced out by a pressurized oxygen/fuel mixture entering behind the vanes through ports and the vanes are pushed back into the rotor due to narrowing elliptical walls of the housing.

W. Peitzke, et.al., "Multilobe Rotary Motion Asymmetric Compression/Expansion Engine", U.S. Pat. No. 7,578,278 B2 (Aug. 25, 2009) describe a rotary engine with multiple pivotally mounted lobes desmodromically extendible and retractable from a rotor to trace asymmetric volumes for inlet and compression and for inlet and exhaust based on the contour of the engine case, which the lobes sealingly engage.

J. Rodgers, "Rotary Engine", U.S. Pat. No. 7,713,042, B1 (May 11, 2010) describes a rotary engine configured to use compressed air or high pressure steam to produce power. The engine includes a rotor having three slotted piston, opposed inlet ports running through a central valve into the slotted pistons, and a casing having two exhaust ports.

Valves

T. Larson, "Rotary Engine", U.S. Pat. No. 4,548,171 (Oct. 22, 1985) describes a rotary engine having a plurality of passages for intake, compression, expansion, and exhaust and valve means to selectively open and close the passages in a cycle of the engine.

S. Nagata, et.al., "Four Cycle Rotary Engine", U.S. Pat. No. 5,937,820 (Aug. 17, 1999) describes a rotary engine configured with an oblong casing, a circular shaped rotor therein, vanes attached to the rotor, and inlet and outlet valves. Means for manipulating the inlet and outlet valves are housed in the rotor.

Seals

L. Keller, "Rotary Vane Device with Improved Seals", U.S. Pat. No. 3,883,277 (May 13, 1975) describes an eccentric rotor vane device having a plurality of annularly related radial vanes, independently pivotal and rotatable about a vane axis, where seal means include a plurality of cylindrical rollers that serve as vane guides intermediate each pair of vanes, the cylindrical rollers adjacent each face of each respective lateral vane face so that the vane traverses radially inward and outward with the vanes lateral faces rolling on the rollers.

J. Wyman, "Rotary Motor", U.S. Pat. No. 4,115,045 (Sep. 19, 1978) describes a rotary steam engine having a peripheral, circular casing with side walls defining an interior cylindrical section and a rotor adapted to rotate therein, where the rotor includes a series of spaced transverse lobes with spring-biased transverse seals adapted to engage the inner periphery of the casing and the casing having a series of spaced spring-biased transverse vanes adapted to engage the outer periphery seals and lobes of the rotor.

F. Lowther, "Rotary Sliding Vane Device with Radial Bias Control", U.S. Pat. No. 4,355,965 (Oct. 26, 1982) describes a rotary sliding vane device having vanes having longitudinal passages and axial passages therethrough for supplying lubrication and sealing fluid to the tip and axial end portions of the vane.

H. Banasiuk, "Floating Seal System for Rotary Devices", U.S. Pat. No. 4,399,863 (Aug. 23, 1983) describes a floating seal system for rotary devices to reduce gas leakage around the rotary device. The peripheral seal bodies have a generally U-shaped cross-section with one of the legs secured to a support member and the other forms a contacting seal against the rotary device. A resilient flexible tube is positioned within a tubular channel to reduce gas leakage across the tubular channel and a spacer extends beyond the face of the floating channel to provide a desired clearance between the floating channel and the face of the rotary device.

C. David, "External Combustion Rotary Engine", U.S. Pat. No. 4,760,701 (Aug. 2, 1988) describes an external combustion rotary engine configured to operate using compressed air in internal expansion chambers. A fraction of the compressed air is further compressed and used as an air pad cushion to isolate rotating engine components from fixed position engine components.

E. Slaughter, "Hinged Valved Rotary Engine with Separate Compression and Expansion Chambers", U.S. Pat. No. 4,860,704 (Aug. 29, 1989) describes a hinge valved rotary engine where air is compressed by cooperation of a hinged compression valve that sealingly engages a compression rotor of the engine. Further, vanes expansion rotor lobe seals are forced into contact with the peripheral surface of the expansion chamber using springs.

C. Parme, "Seal Rings for the Roller on a Rotary Compressor", U.S. Pat. No. 5,116,208 (May 26, 1992) describes a sliding vane rotary pump, including: a housing, a roller mounted in the cylindrical housing, and bearing plates for closing top and bottom ends of the cylindrical opening. A seal ring is disposed within a counterbored surface of each end of the cylindrical ring, the internal space is filled with a pressurized fluid supplied by the compressor, and the pressurized fluid exerts a bias force on the seal rings causing the seal rings to move outwardly from the ends of the roller to form a seal with the bearing plates.

J. Kolhouse, "Self-Sealing Water Pump Seal", U.S. Pat. No. 5,336,047 (Aug. 9, 1994) describes a self-sealing water pump seal having a barrier after a primary seal, the barrier designed to become clogged over time with solids leaking past the primary seal, thereby forming a secondary seal.

O. Lien, "Rotary Engine Piston and Seal Assembly", U.S. Pat. No. 5,419,691 (May 30, 1995) describes a rotary engine piston and seal assembly having a cube shaped piston and a pair of grooves running around all four sliding side surfaces of the piston. the grooves contain a series of segmented metal seal compressed against mating surfaces with seal springs.

T. Stoll, et.al., "Hinged Vane Rotary Pump", U.S. Pat. No. 5,571,005 (Nov. 5, 1996) describes a hinged vane rotary pump including: a cylindrical chamber, a rotor eccentrically mounted within the chamber, and a plurality hinged vanes, where wear on the vane effectively moves to the center of the vane.

D. Andres, "Air Bearing Rotary Engine", U.S. Pat. No. 5,571,244 (Nov. 5, 1996) describes a rotary engine including vanes having tip apertures supplied with pressurized fluid to provide air bearings between the vane tip and a casing of the stator housing.

J. Klassen, "Rotary Positive Displacement Engine", U.S. Pat. No. 6,036,463 (Mar. 14, 2000) describes an engine having a pair of rotors both housed within a single housing, where each rotor is mounted on an axis extending through a center of the housing, where the rotors interlock with each other to define chambers, where a contact face of a first rotor is defined by rotation of a conical section of a second rotor of the two rotors, such that there is a constant linear contact between opposing vanes on the two rotors.

J. Klassen, "Rotary Engine and Method for Determining Engagement Surface Contours Therefor", U.S. Pat. No. 6,739,852 B1 (May 25, 2004) describes a rotary engine configured with rotor surfaces that are mirror images of engine interior contours to form a seal and recesses for interrupting the seal at predetermined points in a rotational cycle of the engine.

J. Rodgers, "Rotary Engine", U.S. Pat. No. 7,713,042 B1 (May 11, 2010) describes a rotary engine configured with pistons, where springs within each piston cause an angled tip of the piston to contact a rotary chamber edge upon start up.

B. Garcia, "Rotary Internal Combustion Engine", U.S. patent application no. 2006/0102139 A1 (May 18, 2006) describes a rotary internal combustion engine having a coaxial stator, a rotor, and a transmission system, where the transmission system causes retraction movements of a first group of blades to transmit to a second group of blades forming a seal between the free edge of the blades and the inner surface of the engine.

Exhaust

W. Doerner, et.al., "Rotary Rankine Engine Powered Electric Generating Apparatus", U.S. Pat. No. 3,950,950 (Apr. 20, 1976) describe a rotary closed Rankine cycle turbine engine powered electric generating apparatus having a single condenser and/or a primary and secondary condenser for condensing exhaust vapors.

D. Aden, et.al., "Sliding Vane Pump", U.S. Pat. No. 6,497,557 B2 (Dec. 24, 2002) describes a sliding vane pump having a plurality of inlet ports, internal discharge ports, and at least two discharge ports where all of the fluid from one of the internal discharge ports exits through one of the external discharge ports.

J. Klassen, "Method for Determining Engagement Surface Contours for a Rotor of an Engine", U.S. Pat. No. 6,634,873 B2 (Oct. 21, 2003) describes a rotary engine configured with rotor surfaces that are mirror images of engine interior contours to form a seal and recesses for interrupting the seal at predetermined points in a rotational cycle of the engine.

D. Patterson, et.al., "Combustion and Exhaust Heads for Fluid Turbine Engines", U.S. Pat. No. 6,799,549 B1 (Oct. 5, 2004) describes an internal combustion rotary turbine engine including controls for opening and closing an exhaust valve during engine operation.

R. Gorski, "Gorski Rotary Engine", U.S. Pat. No. 7,073,477 B2 (Jul. 11, 2006) describes a rotary engine configured with solid vanes extending from a rotor to an interior wall of the stator housing. A series of grooves in the interior wall permit the expanding exhaust gases to by-pass the vanes proximate the combustion chamber to engage the larger surface area of the vane protruding from the rotor.

H. Maeng, "Sliding Vane of Rotors", U.S. Pat. No. 7,674,101 B2 (Mar. 9, 2010) describes a sliding vane extending through a rotor in diametrically opposed directions and rotating with the rotor. Diametrically opposed ends of the sliding vane include sealing slots. The sliding vane further includes two pairs of compression plates provided in plate sealing slots for sealing the edges of the vane, the compression plates activated using springs in the vane.

E. Carnahan, "External Heat Engine of the Rotary Vane Type and Compressor/Expander", U.S. patent application no. US 2008/0041056 A1 (Feb. 21, 2008) describes a rotary engine using injected cool liquid into a compression section of the engine.

Cooling

G. Cann, "Rankine Cycle Engine", U.S. Pat. No. 4,367,629 (Jan. 11, 1983) describes a Rankine cycle engine having a coolant disposed within rotor coolant passages that uses centrifugal force to accelerate movement of the coolant.

T. Maruyama, et.al. "Rotary Vane Compressor With Suction Port Adjustment", U.S. Pat. No. 4,486,158 (Dec. 4, 1984) describe a sliding vane type rotary compressor with suction port adjustment, of which refrigerating capacity at the high speed operation is suppressed by making use of suction loss involved when refrigerant pressure in the vane chamber becomes lower than the pressure of the refrigerant supply source in the suction stroke of the compressor.

R. Ullyott, "Internal Cooling System for Rotary Engine", U.S. Pat. No. 7,412,831 B2 (Aug. 19, 2008) describes a rotary combustion engine with self-cooling system, where the cooling system includes: a heat exchanging interface and a drive fan integrated on an output shaft of the rotary engine, the fan providing a flow of forced air over the heat exchanging interface.

Varying Loads

T. Alund, "Sliding Vane Machines", U.S. Pat. No. 4,046,493 (Sep. 6, 1977) describes a sliding vane machine using a valve and pressure plates to control the working area of valves in the sliding vane machine.

Jet

A. Schlote, "Rotary Heat Engine", U.S. Pat. No. 5,408,824 (Apr. 25, 1995) describes a jet-propelled rotary engine having a rotor rotating about an axis and at least one jet assembly secured to the rotor and adapted for combustion of a pressurized oxygen-fuel mixture.

Problem Statement

What is needed is an engine, pump, expander, and/or compressor that more efficiently converts fuel or energy into motion, work, power, stored energy, and/or force. For example, what is needed is an external combustion rotary heat engine that more efficiently converts about adiabatic expansive energy of the gases driving the engine into rotational power and/or energy for use in a variety of applications.

SUMMARY OF THE INVENTION

The invention comprises a rotary engine method and apparatus using a vane having at least one wing, where the vane and wing rotate with a rotor about a shaft in a rotary engine.

BRIEF DESCRIPTION OF THE DRAWINGS

A more complete understanding of the present invention is derived by referring to the detailed description and claims when considered in connection with the Figures, wherein like reference numbers refer to similar items throughout the Figures.

DETAILED DESCRIPTION OF THE PREFERRED EMBODIMENTS

Figure 1:
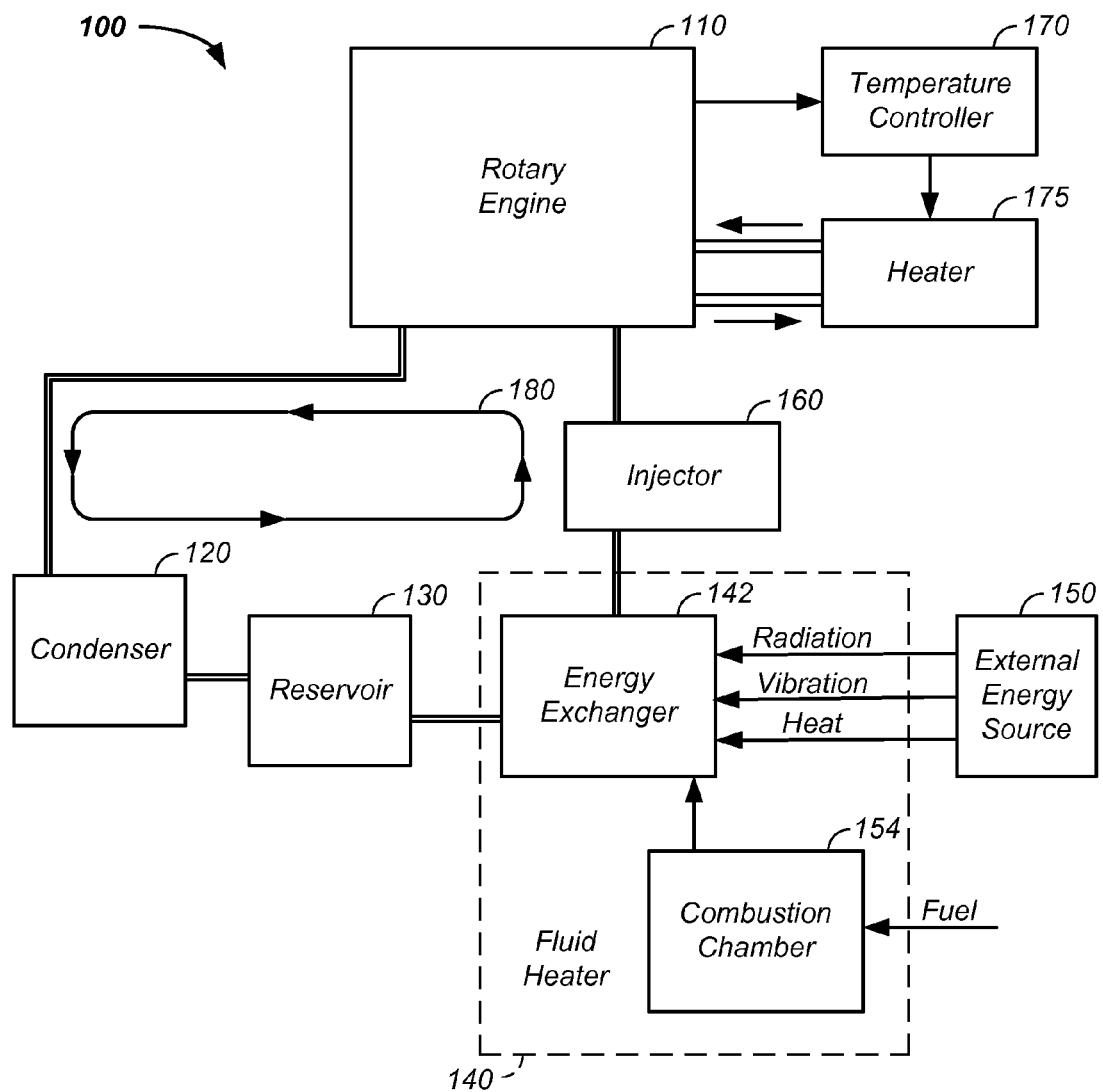
FIG. 1 illustrates a rotary engine system.

In one embodiment, the invention comprises a rotary apparatus, such as an engine, method, and/or apparatus using a vane with at least one vane extension or vane wing rotating with a rotor about a shaft in a rotary engine. The vane extension or vane wing optionally includes: a curved outer surface, a curved inner surface, an aperture through the extension, and/or a curved tunnel passing through the wing. For example, the curved outer surface of the wing curves away from an inner wall of the engine housing as a function of distance away from the vane body. In a second example, the curved inner surface of the wing curves toward the inner wall of the engine housing as a function of distance from the vane body. In a third example fuel flows through the curved tunnel, aperture, or passageway thereby passing through the wing, which creates a partial negative pressure during engine operation that lifts an end or tip of the vane toward the housing while simultaneously reducing pressure between the vane end and the housing. The curved tunnel or passageway relieves pressure above the vane extension or vane wing thereby reducing possible chatter at the engine vane end/engine housing interface.

In another embodiment, the rotary engine method and apparatus uses an offset rotor. The rotary engine is preferably a component of an engine system using a recirculating liquid/vapor.

In yet another embodiment, an engine is described for operation on a fuel expanding about adiabatically in a power stroke of the engine. To aid the power stroke efficiency, the rotary engine contains one or more of a rotor configured to rotate in a stator, the rotor offset along both an x-axis and a y-axis relative to a center of the stator, a vane configured to span a distance between the rotor and the stator, where the inner wall of the stator further comprises at least one of: a first cut-out in the housing at the initiation of the power stroke, use of a build-up in the housing at the end of the power stroke, and/or use of a second cut-out in the housing at the completion of rotation of the rotor in the engine. The engine yields a cross-sectional area expanding during a portion of the power stroke at about the Fibonacci ratio.

For example, a rotary engine is provided for operation on a recirculating fuel expanding about adiabatically during a power cycle or power stroke of the rotary engine. To aid the power stroke efficiency, the rotary engine preferably contains one or more of:

- a double offset rotor geometry relative to a housing or a stator, such as an eccentrically positioned rotor relative to the housing, where the eccentrically positioned rotor is additionally offset so that the rotor is offset from the housing center along both an x-axis and a y-axis;
- use of a first cut-out in the engine housing at the initiation of the power stroke;
- use of a build-up in the housing at the end of the power stroke; and/or
- use of a second cut-out in the housing at the completion of rotation of the rotor in the engine.

The first-cut out allows an increased distance between a stator or the housing and the rotor, which yields an increased cross-sectional area of the expansion chamber, which yields increased power of the engine. The build-up allows an increased x-axis and y-axis offset of the double offset rotor relative to the center of the housing. More particularly, the vane reaches full extension before the six o'clock position to optimize power and without the build up at the six o'clock position the vane overextends potentially causing unit failure. The second cut-out allows room for a vane, having a vane tip, a vane wing, a vane wingtip, or a vane end not fully retractable into the rotor, to pass between the rotor and the stator at about the eleven o'clock position without restraint of movement.

In yet still another embodiment, a rotary engine is described including: (1) a rotor eccentrically located within a housing, the rotor configured with a plurality of rotor vane slots; (2) a first vane of a set of vanes separating an interior space between the rotor and the housing into at least a trailing chamber and a leading chamber, where the first vane slidingly engages a rotor vane slot; (3) a first conduit within the rotor configured to communicate a first flow between the trailing chamber and the rotor vane slot; and (4) a second conduit within the rotor configured to communicate a second flow between the trailing chamber and the first conduit. Optionally, a vane seal is affixed to the first vane or the rotor, where the vane seal is configured to valve the first conduit or a vane conduit, respectively.

In still yet another embodiment, a rotary engine is described having fuel paths that run through a portion of a rotor of the rotary engine, through a portion of a shaft, and/or through a vane of the rotary engine. The fuel paths are optionally opened and shut as a function of rotation of the rotor to enhance power provided by the engine. The valving that opens and/or shuts a fuel path operates to: (1) equalize pressure between an expansion chamber and a rotor-vane chamber and/or (2) to control a booster, which creates a pressure differential resulting in enhanced flow of fuel. The fuel paths, valves, seals, and boosters are further described, infra.

In yet another embodiment, a rotary engine or an external combustion rotary engine is described including: (1) a rotor located within a housing, the rotor configured with a plurality of rotor vane slots; (2) a vane separating an interior space between the rotor and the housing into at least a trailing chamber and a leading chamber, where the vane slidingly engages a rotor vane slot; (3) a first conduit within the rotor configured to communicate a first flow between the trailing chamber and the rotor vane slot; and (4) a lower trailing vane seal affixed to the vane, the lower trailing vane seal configured to valve the first conduit with rotation of the rotor. Optionally, a second conduit within the rotor is configured to communicate a second flow between the trailing chamber and the first conduit. Optionally, movement of the vane operates to directly valve one or more additional fuel flow paths as a function of rotation of the rotor.

In still another embodiment, a rotary engine is described including: (1) a rotor located within a housing, the rotor configured with a plurality of rotor vane slots; (2) a vane separating an interior space between the rotor and the housing into at least a trailing chamber and a leading chamber, where the vane slidingly engages a rotor vane slot; (3) a first passage through the vane, the first passage including a first exit port into the rotationally trailing chamber; and (4) a second exit port to the rotationally trailing chamber, where the first exit port and the second exit port connect to any of: (a) the first passage through the vane and (b) the first passage and a second passage through the vane, respectively. Optionally, one or more seals affixed to the vane and/or the rotor, valve the first passage, the second passage, a vane wingtip, and/or a conduit through the rotor.

In yet another embodiment, a vane or a vane component reduces chatter or vibration of a vane end against the inner wall of the housing of the rotary engine during operation of the engine, where chatter leads to unwanted opening and/or closing of the seal between an expansion chamber and a leading chamber. For example, the bearings bear the force of the vane against the inner wall of the rotary engine housing relieving centrifugal force, which facilitates the seals sealing the vane to the housing and additionally to provides a seal between the leading chamber and the expansion chamber of the rotary engine. Pressure build-up between the vane end and the inner wall of the housing, which results in unwanted engine chatter or chatter about the vane end proximate the housing, is reduced through the use of one or more pressure relief cuts, and optionally with a vane path booster element. The reduction of engine chatter increases engine power and/or efficiency. Further, the pressure relief aids in uninterrupted contact of the seals between the vane and inner housing of the rotary engine, which yields enhanced rotary engine efficiency.

In still another embodiment, a vane is carried with a rotor. The vane optionally includes: (1) a central vane axis extending radially outward along a y-axis, the y-axis comprising a line from a center of the rotor to a housing; and (2) a vane end intersecting the y-axis proximate an inner surface of the housing. Rotation of the rotor within the housing generates a centrifugal force of the vane toward the housing. The centrifugal force is primarily distributed and/or opposed with a first sealing element mounted on an end of the vane, such as a rigid support, ball bearing, and/or a roller bearing. The rigid structure of the first sealing element allows use of a second flexible sealing element mounted on the vane end. The second flexible sealing element performs as a seal between a trailing expansion chamber and a leading expansion chamber on opposite sides of the vane. The rigid seal and the flexible seal typically function independently of each other as separate constituents of the tip or end of a given vane. As the rigid sealing element resists the centrifugal force, the second sealing element is preferably designed to resist less than about ten percent of the outward centrifugal force of a given vane into the housing with rotation of the rotor in the housing.

In another embodiment, a rotary engine method and apparatus using a vane rotating with a rotor about a shaft in a rotary engine is described, where the vane has a vane end or vane tip including:

- one or more bearings for bearing the force of the vane applied to the inner housing;
- one or more seals for providing a seal between the leading chamber and expansion chamber;
- one or more pressure relief apertures or cuts for reducing pressure build-up between the vane extensions of vane wings and the inner wall of the housing; and/or
- a booster enhancing pressure equalization and/or flow from above to below a vane wing.

Further, fuels described maintain about adiabatic expansion to a high ratio of gas/liquid when maintained at a relatively constant temperature via use of a temperature controller for the expansion chambers. Expansive forces of the fuel acting on the rotor are aided by hydraulic forces, vortical forces, an about Fibonacci-ratio increase in volume in an expansion chamber during the power cycle or power stroke, sliding vanes, and/or swinging vanes between the rotor and housing. Herein, a power stroke refers to the stroke of a cyclic motor or engine which generates force.

Rotary Engine

Herein, rotary engine examples are used to explain the engine system 100 elements. However, the engine system 100 elements additionally apply in-part and/or in-whole to expander engines, heat engines, pumps, and/or compressors. A rotary engine system uses power from an expansive force, such as from an internal or external combustion process, to produce an output energy, such as a rotational or electric force.

Referring now to FIG. 1, a rotary engine 110 is preferably a component of an engine system 100. In the engine system 100, gas/liquid in various states or phases are optionally re-circulated in a circulation system 180, illustrated figuratively. In the illustrated example, gas output from the rotary engine 110 is transferred to and/or through a condenser 120 to form a liquid; then through an optional reservoir 130 to a fluid heater 140 where the liquid is heated to a temperature and pressure sufficient to result in state change of the liquid to gas form when passed through an injector 160 and back into the rotary engine 110. In one case, the fluid heater 140 optionally uses an external energy source 150, such as radiation, vibration, and/or heat to heat the circulating fluid in an energy exchanger 142. In a second case, the fluid heater 140 optionally uses fuel in an external combustion chamber 154 to heat the circulating fluid in the energy exchanger 142. The rotary engine 110, is further described infra.

Still referring to FIG. 1, maintenance of the rotary engine 110 at a set operating temperature enhances precision and/or efficiency of operation of the engine system 100. Hence, the rotary engine 110 is optionally coupled to a temperature controller 170 and/or a block heater 175. Preferably, the temperature controller senses with one or more sensors the temperature of the rotary engine 110 and controls a heat exchange element attached and/or indirectly attached to the rotary engine, which maintains the rotary engine 110 at about the set point operational temperature. In a first scenario, the block heater 175 heats expansion chambers, described infra, to a desired operating temperature. The block heater 175 is optionally configured to extract excess heat from the fluid heater 140 to heat one or more elements of the rotary engine 110, such as the rotor 320, double offset rotor 440, vanes, an inner wall of the housing, an inner wall of the first end plate 212, and/or an inner wall of the first or second end plate 214.

Figure 2:
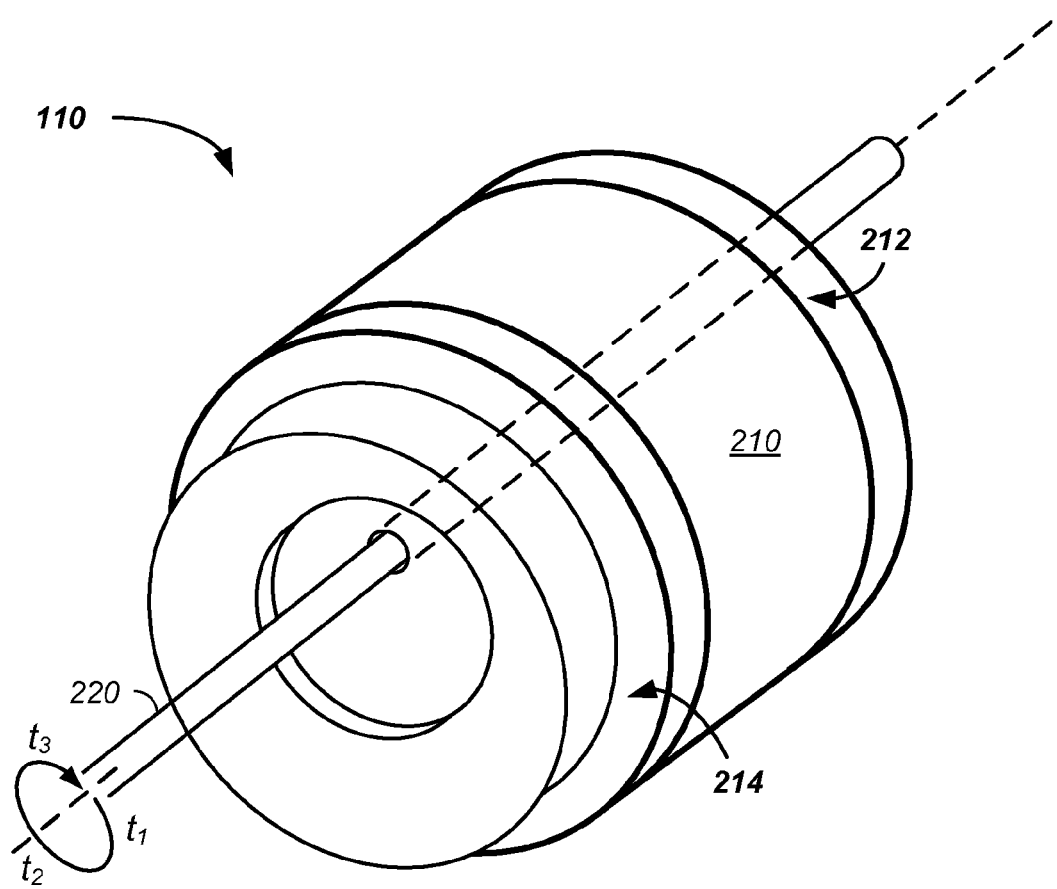
FIG. 2 illustrates a rotary engine housing.

Referring now to FIG. 2, the rotary engine 110 includes a stator or housing 210 on an outer side of a series of expansion chambers, a first end plate 212 affixed to a first side of the housing, and a second end plate 214 affixed to a second side of the housing. Combined, the housing 210, first end plate 212, second end plate 214, and a rotor, described infra, contain a series of expansion chambers in the rotary engine 110. An offset shaft preferably runs into and/or runs through the first end plate 212, inside the housing 210, and into and/or through the second end plate 214. The offset shaft 220 is centered to the rotor 320 or double offset rotor 440 and is offset relative to the center of the rotary engine 110.

Rotors

Rotors of various configurations are used in the rotary engine 110. The rotor 320 is optionally offset in the x- and/or y-axes relative to a z-axis running along the length of the shaft 220. A rotor 320 offset in the x-axis and y-axis relative to a z-axis running along the length of the shaft 220 is referred to herein as a double offset rotor 440. The shaft 220 is optionally double walled or multi-walled. The rotor chamber face 442, also referred to as an outer edge of the rotor, or the rotor outer wall, of the double offset rotor 440 forming an inner wall of the expansion chambers is of any geometry. Examples of rotor configurations in terms of offsets and shapes are further described, infra. The examples are illustrative in nature and each element is optional and is optionally used in various permutations and/or combinations with other elements described herein.

Vanes

A vane or blade separates two chambers of a rotary engine. The vane optionally functions as a seal and/or valve. The vane itself optionally acts as a propeller, impeller, and/or an electromagnetic generator element.

Engines are illustratively represented herein with clock positions, with twelve o'clock being a top of an x-, y-plane cross-sectional view of the engine with the z-axis running along the length of the shaft of the engine. The twelve o'clock position is alternatively referred to as a zero degree position. Similarly twelve o'clock to three o'clock is alternatively referred to as zero degrees to ninety degrees and a full rotation around the clock covers three hundred sixty degrees. Those skilled in the art will immediately understand that any multi-axes illustration system is alternatively used and that rotating engine elements in this coordination system alters only the relative description of the elements without altering the elements themselves or function of the elements.

Figure 3:
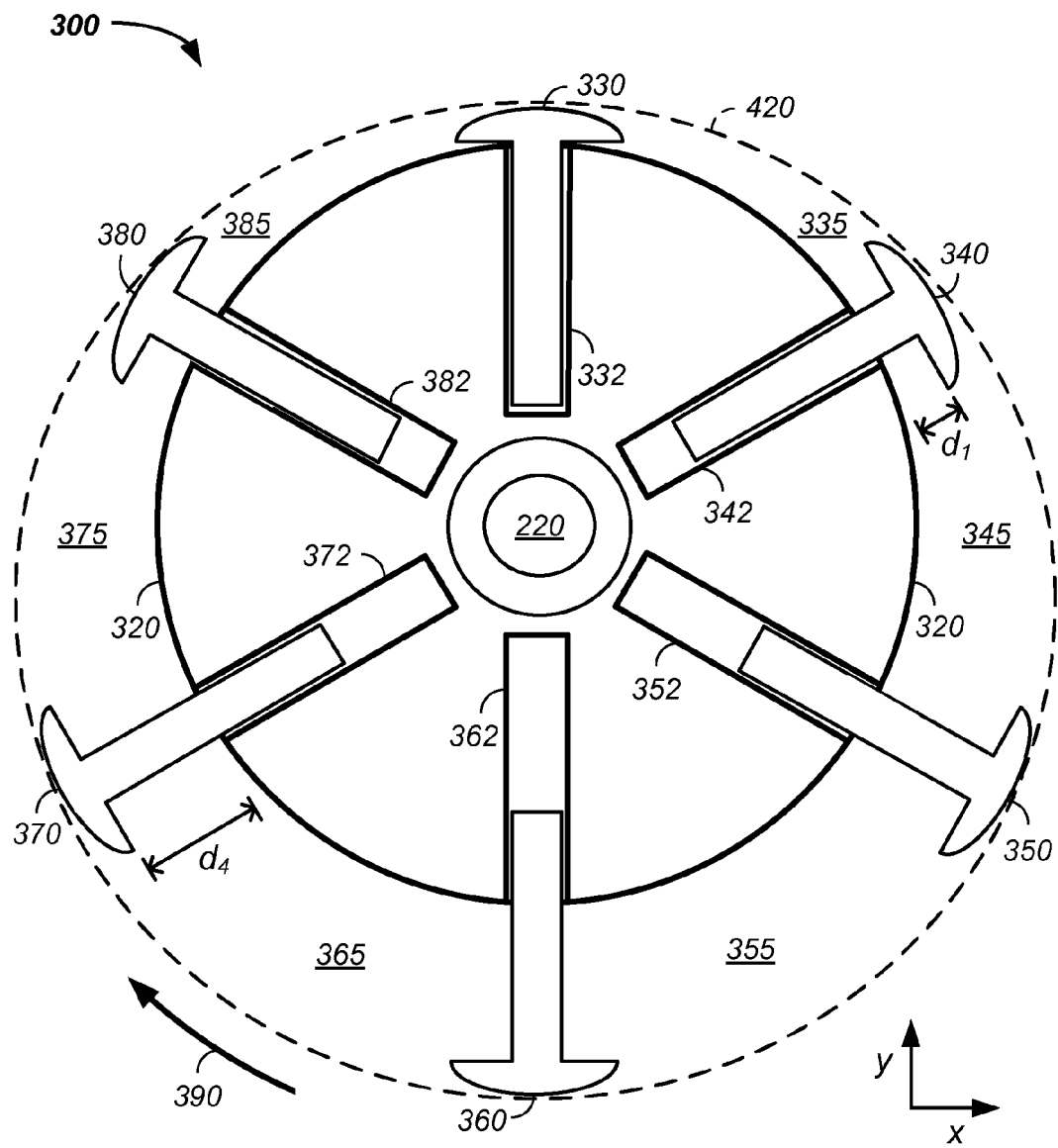
FIG. 3 illustrates a sectional view of a single offset rotary engine.

Referring now to FIG. 3, vanes relative to an inner wall 420 of the housing 210 and relative to a rotor 320 are described. As illustrated, a z-axis runs through the length of the shaft 220 and the rotor rotates around the z-axis. A plane defined by x- and y-axes is perpendicular to the z-axis. Vanes extend between the rotor 320 and the inner wall 420 of the housing 210. As illustrated, the single offset rotor system 300 includes six vanes, with: a first vane 330 at a twelve o'clock position, a second vane 340 at a two o'clock position, a third vane 350 at a four o'clock position, a fourth vane 360 at a six o'clock position, a fifth vane 370 at a ten o'clock position, and a sixth vane 380 at a ten o'clock position. Any number of vanes are optionally used, such as about two, three, four, five, six, eight, or more vanes. Preferably, an even number of vanes are used in the rotor system 300.

Still referring to FIG. 3, the vanes extend outward from vane slots of the rotor 320. As illustrated, the first vane 330 extends from a first vane slot 332, the second vane 340 extends from a second vane slot 342, the third vane 350 extends from a third vane slot 352, the fourth vane 360 extends from a fourth vane slot 362, the fifth vane 370 extends from a fifth vane slot 372, and the sixth vane 380 extends from a sixth vane slot 382. Each of the vanes are slidingly coupled and/or hingedly coupled to the rotor 320 and the rotor 320 is fixedly coupled to the shaft 220. When the rotary engine is in operation, the rotor 320, vanes, and vane slots rotate about the shaft 220. Hence, the first vane 330 rotates from the twelve o'clock position sequentially through each of the two, four, six, eight, and ten o'clock positions and ends up back at the twelve o'clock position. When the rotary engine 210 is in operation, pressure upon the vanes causes the rotor 320 to rotate relative to a non-rotating or rotating inner wall of the housing 420, which causes rotation of shaft 220. As the rotor 210 rotates, each vane slides outward to maintain proximate contact or sealing contact with the inner wall of the housing 420.

Still referring to FIG. 3, expansion chambers or sealed expansion chambers relative to an inner wall 420 of the housing 210, vanes, and rotor 320 are described. As illustrated, the rotary system is configured with six expansion chambers. Each of the expansion chambers reside in the rotary engine 210 along the z-axis between the first end plate 212 and second end plate 214. Further, each of the expansion chambers resides between the rotor 320 and inner wall of the housing 420. Still further, the expansion chambers are contained between the vanes. As illustrated, a first expansion chamber 335 is in a first volume between the first vane 330 and the second vane 340, a second expansion chamber 345 is in a second volume between the second vane 340 and the third vane 350, a third expansion chamber 355 is in a third volume between the third vane 350 and the fourth vane 360, a fourth expansion chamber or first reduction chamber 365 is in a fourth volume between the fourth vane 360 and the fifth vane 370, a fifth expansion chamber or second reduction chamber 375 is in a fifth volume between the fifth vane 370 and the sixth vane 380, and a sixth expansion chamber or third reduction chamber 385 is in a sixth volume between the sixth vane 380 and the first vane 330. The first, second, and third reduction chambers 365, 375, 385 are optionally compression or exhaust chambers. As illustrated, the volume of the second expansion chamber 345 is greater than the volume of the first expansion chamber and the volume of the third expansion chamber is greater than the volume of the second expansion chamber. The increasing volume of the expansion chambers, during the power stroke, in the first half of a rotation of the rotor 320 about the shaft 220 results in greater efficiency, power, and/or torque, as described infra.

Single Offset Rotor

Still referring to FIG. 3, a single offset rotor is illustrated. The housing 210 has a center position in terms of the x-, y-, and z-axis system. In a single offset rotor system, the shaft 220 running along the z-axis is offset along one of the x- or y-axes. For clarity of presentation, expansion chambers are referred to herein as residing in static positions and having static volumes, though they rotate about the shaft and change in both volume and position with rotation of the rotor 320 about the shaft 220. As illustrated, the shaft 220 is offset along the y-axis, though the offset could be along the x-axis. Without the offset along the y-axis, each of the expansion chambers is uniform in volume. With the offset, the second expansion chamber 345, at the position illustrated, has a volume greater than the first expansion chamber and the third expansion chamber has a volume greater than that of the second expansion chamber. The fuel mixture from the fluid heater 140 or vapor generator is injected via one or more injectors 160 into the first expansion chamber 335 and/or into the shaft 220. As the rotor rotates, the volume of the expansion chambers increases, as illustrated in the static position of the second expansion chamber 345 and third expansion chamber 355. The increasing volume allows an expansion of the fuel, such as a gas, vapor, and/or plasma, which preferably occurs about adiabatically and/or in an about isothermal environment. The expansion of the fuel releases energy that is forced against the vane and/or vanes, which results in rotation of the rotor. The increasing volume of a given expansion chamber through the first half of a rotation of the rotor 320, such as in the power stroke described infra, about the shaft 220 combined with the extension of the vane from the rotor shaft to the inner wall of the housing results in a greater surface area for the expanding gas to exert force against resulting in rotation of the rotor 320. The increasing exposed surface area of the vane, reactive to the expanding gas, as a function of rotation in the first half of the rotation increases efficiency of the rotary engine 110. For reference, relative to double offset rotary engines and rotary engines including build-ups and cutouts, described infra, the single offset rotary engine has a first distance, $d_1$, at the two o'clock position and a fourth distance, $d_4$, between the rotor 320 and inner wall of the housing 430 at the eight o'clock position.

Double Offset Rotor

Figure 4:
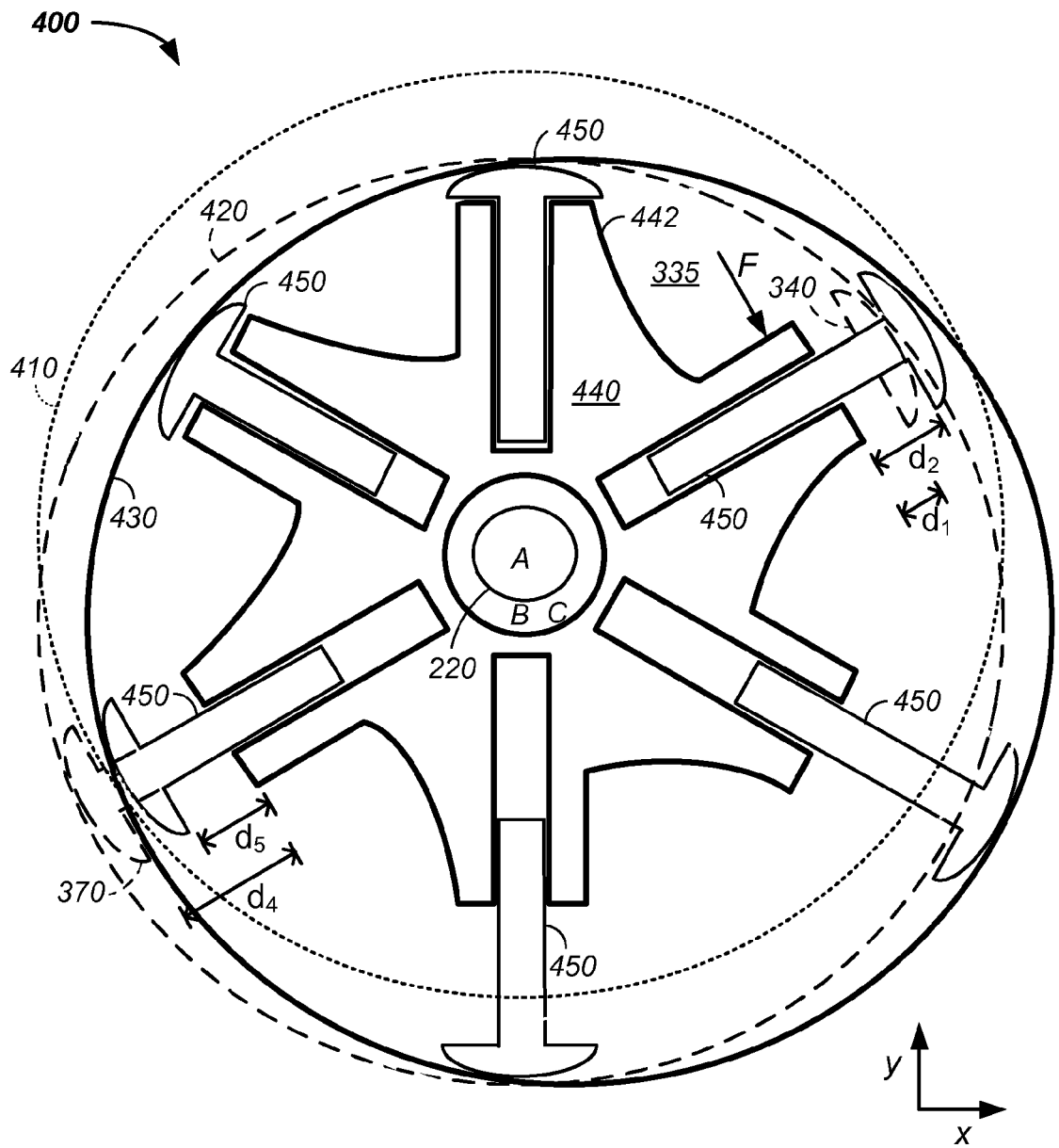
FIG. 4 illustrates a sectional view of a double offset rotary engine.

Referring now to FIG. 4, a double offset rotary engine 400 is illustrated. To demonstrate the offset of the housing, three housing 210 positions are illustrated.

The double offset rotor 440 and vanes 450 are illustrated only for the double offset housing position 430. In the first zero offset position, the first housing position 410 is denoted by a dotted line and the housing 210 is equidistant from the double offset rotor 440 in the x-, y-plane. Stated again, in the first housing position, the double offset rotor 440 is centered relative to the first housing position 410 about point 'A'. The centered first housing position 410 is non-functional. The single offset rotor position was described, supra, and illustrated in FIG. 3. The single offset housing position 420 is repeated and still illustrated as a dashed line in FIG. 4. The housing second position is a single offset housing position 420 centered at point 'B', which has an offset in only the y-axis versus the zero offset housing position 410. A third preferred housing position is a double offset rotor position 430 centered at position 'C'. The double offset housing position 430 is offset in both the x- and y-axes versus the zero offset housing position. The offset of the housing 430 relative to the double offset rotor 440 in two axes results in efficiency gains of the double offset rotary engine, as described supra.

Still referring to FIG. 4, the extended two o'clock vane position 340 for the single offset rotor illustrated in FIG. 3 is re-illustrated in the same position in FIG. 4 as a dashed line with distance, $d_1$, between the vane wing and the outer edge of the double offset rotor 440. It is observed that the extended two o'clock vane position 450 for the double offset rotor has a longer distance, $d_2$, between the vane wing and the outer edge of the double offset rotor 440 compared with the extended position vane in the single offset rotor. The larger extension, $d_2$, yields a larger cross-sectional area for the expansive forces in the first expansion chamber 335 to act on, thereby resulting in larger forces, such as turning forces or rotational forces, from the expanding gas pushing on the double offset rotor 440. Note that the illustrated double offset rotor 440 in FIG. 4 is illustrated with the rotor chamber face 442 having a curved surface running from near a wing tip of a vane toward the shaft in the expansion chamber to increase expansion chamber volume and to allow a greater surface area for the expanding gases to operate on with a force vector, F. The curved surface is of any specified geometry to set the volume of the expansion chamber 335. Similar force and/or power gains are observed from the twelve o'clock to six o'clock position using the double offset rotary engine 400 compared to the single offset rotary engine 300.

Still referring to FIG. 4, The fully extended eight o'clock vane 370 of the single offset rotor is re-illustrated in the same position in FIG. 4 as a dashed image with distance, $d_4$, between the vane wing and the outer edge of the double offset rotor 440. It is noted that the double offset housing 430 forces full extension of the vane to a smaller distance, $d_5$, between the vane wing tip and the outer edge of the double offset rotor 440. However, rotational forces are not lost with the decrease in vane extension at the eight o'clock position as the expansive forces of the gas fuel are expended by the six o'clock position and the gases are vented before the eight o'clock position, as described supra. The detailed eight o'clock position is exemplary of the six o'clock to twelve o'clock positions.

The net effect of using a double offset rotary engine 400 is increased efficiency and power in the power stroke, such as from about the twelve o'clock position to about the six o'clock position or through about 180 degrees, using the double offset rotary engine 400 compared to the single offset rotary engine 300. The double offset rotary engine design 400 reduces loss of efficiency, parasitic negative work, or power from the six o'clock to twelve o'clock positions relative to the single offset rotary engine 300.

Cutouts, Build-ups, and Vane Extension

FIGS. 3 and 4 illustrate inner walls of housings 410, 420, and 430 that are circular. However, an added power and/or efficiency advantage results from cutouts and/or buildups in the inner surface of the housing. For example, an x-, y-axes cross-section of the inner wall shape of the housing 210 is optionally non-circular, elliptical, oval, egg shaped, cutout relative to a circle, and/or built up relative to a circle.

Figure 5:
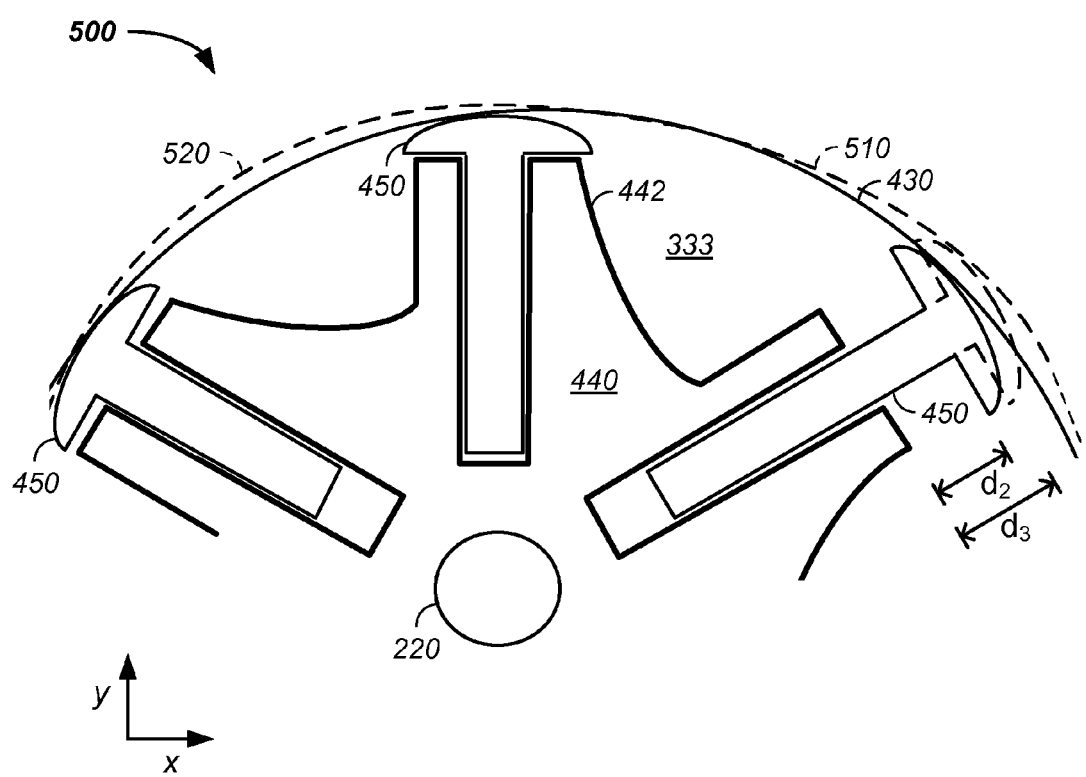
FIG. 5 illustrates housing cut-outs.

Referring now to FIG. 5 and still referring to FIG. 4, optional cutouts in the housing 210 are described. A cutout is readily understood as a removal of material from a elliptical inner wall of the housing; however, the material is not necessarily removed by machining the inner wall, but rather is optionally cast or formed in final form or is defined by the shape of an insert piece or insert sleeve that fits along the inner wall 420 of the housing. For clarity, cutouts are described relative to the inner wall of the double offset rotor housing 430; however, cutouts are optionally used with any housing 210. The optional cutouts and build-ups described herein are optionally used independently or in combination.

Still referring to FIG. 5, a first optional cutout is illustrated at about the one o'clock to three o'clock position of the housing 430. To further clarify, a cut-out, which is optionally referred to as a vane extension limiter beyond a nominal distance to the housing 430, is optionally: (1) a machined away portion of an otherwise inner wall of the circular housing 430; (2) an inner wall housing 430 section having a greater radius from the center of the shaft 220 to the inner wall of the housing 430 compared with a non-cutout section of the inner wall housing 430; (3) is a section molded, cast, and/or machined to have a further distance for the vane 450 to slide to reach the housing compared to a nominal circular housing; or (4) is a removable housing insert circumferentially bordering the inner wall housing 430 about the rotor, where the housing insert includes an increased distance from the center of the rotor within the cut-out at the one o'clock to three o'clock position. For clarity, only the ten o'clock to two o'clock position of the double offset rotary engine 400 is illustrated. The first cutout 510 in the housing 430 is present in about the twelve o'clock to three o'clock position and preferably at about the two o'clock position. Generally, the first cutout allows a longer vane 450 extension at the cutout position compared to a circular or an elliptical x-, y-cross-section of the housing 430. To illustrate, still referring to FIG. 5, the extended two o'clock vane position 340 for the double offset rotor illustrated in FIG. 4 is re-illustrated in the same position in FIG. 5 as a solid line image with distance, $d_2$, between the vane wing tip and the outer edge of the double offset rotor 440. It is observed that the extended two o'clock vane position 450 for the double offset rotor having cutout 510 has a longer distance, $d_3$, between the vane wing tip and the outer edge of the double offset rotor 440 compared with the extended position vane in the double offset rotor. The larger extension, $d_3$, yields a larger cross-sectional area for the expansive forces, pump forces, compression forces, and/or hydraulic forces in the first expansion chamber 335 to act on, thereby resulting in larger turning forces from the expanding gas pushing on the double offset rotor 440. To summarize, the vane extension distance, $d_1$, using a single offset rotary engine 300 is less than the vane extension distance, $d_2$, using a double offset rotary engine 400, which is less than vane extension distance, $d_3$, using a double offset rotary engine with a first cutout as is observed in equation 1.

$$d_1 < d_2 < d_3 \qquad \text{(eq. 1)}$$

Still referring to FIG. 5, a second optional cutout 520 is illustrated at about the eleven o'clock position of the housing 430. The second cutout 520 is present at about the ten o'clock to twelve o'clock position and preferably at about the eleven o'clock to twelve o'clock position. Generally, the second cutout allows a vane having a wingtip protrusion, or radial extension, described supra, to physically fit between the double offset rotor 440 and housing 430 in a double offset rotary engine 500. The second cutout 520 also adds to the magnitude of the offset possible in the single offset engine 300 and in the double offset engine 400, which increases distances $d_2$ and $d_3$.

Figure 6:
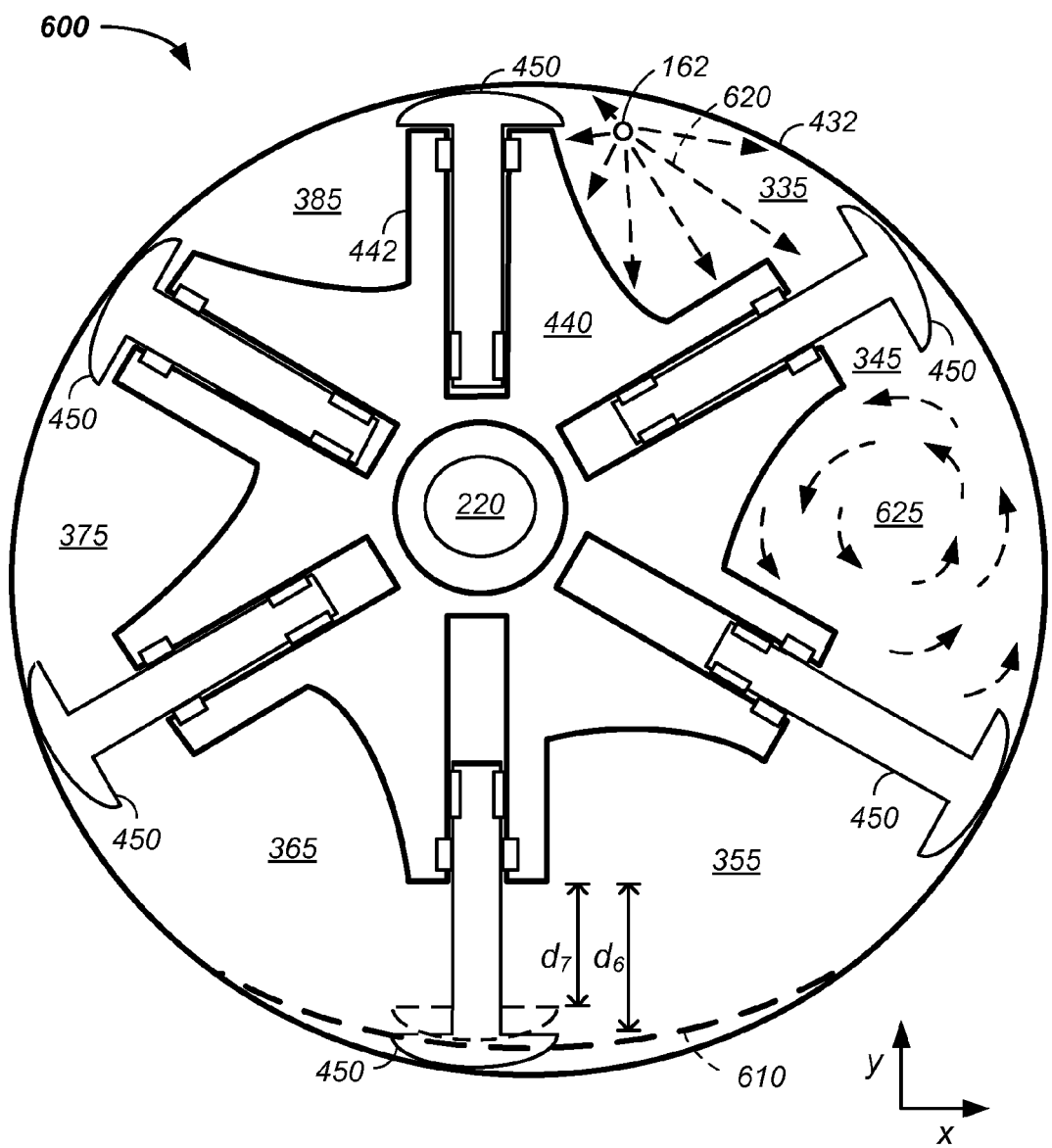
FIG. 6 illustrates a housing build-up.

Referring now to FIG. 6, an optional build-up 610 on the interior wall of the housing 430 is illustrated from an about five o'clock to an about seven o'clock position of the engine rotation. The build-up 610 allows a greater offset of the double offset rotor 440 up along the y-axis. Without the build-up 610, a smaller y-axis offset of the double offset rotor 440 relative to the housing 430 is needed as the vane 450 at the six o'clock position would not reach, without possible damage due to overextension of the vane, the inner wall of the housing 430. As illustrated, the build-up 610 reduces the vane extension distance required for the vane 450 to reach from the double offset rotor 440 to the housing 430 from a sixth distance, $d_6$, from an elliptical housing to a seventh distance, $d_7$ of the built-up housing 610. As described, supra, the greater offset in the x- and y-axes of the double offset rotor 440 relative to the housing 430 yields greater rotary engine 110 output power and/or efficiency by increasing the volume of the first expansion chamber 335, second expansion chamber 345, and/or third expansion chamber 355.

METHOD OF OPERATION

For the purposes of this discussion, any of the single offset-rotary engine 300, double offset rotary engine 400, rotary engine having a cutout 500, rotary engine having a build-up 600, or a rotary engine having one or more elements described herein is applicable to use as the rotary engine 110 used in this example. Further, any housing 210, rotor 320, and vane 450 dividing the rotary engine 210 into expansion chambers is optionally used as in this example. For clarity, a reference expansion chamber is used to describe a current position of the expansion chambers. For example, the reference chamber rotates in a single rotation from the twelve o'clock position and sequentially through the one o'clock position, three o'clock position, five o'clock position, seven o'clock position, nine o'clock position, and eleven o'clock position before returning to the twelve o'clock position. The reference expansion chamber is alternatively referred to as a compression chamber from about a six o'clock to the twelve o'clock position. Alternately, the reference expansion chamber functions as a compression chamber or pump chamber.

Figure 7:
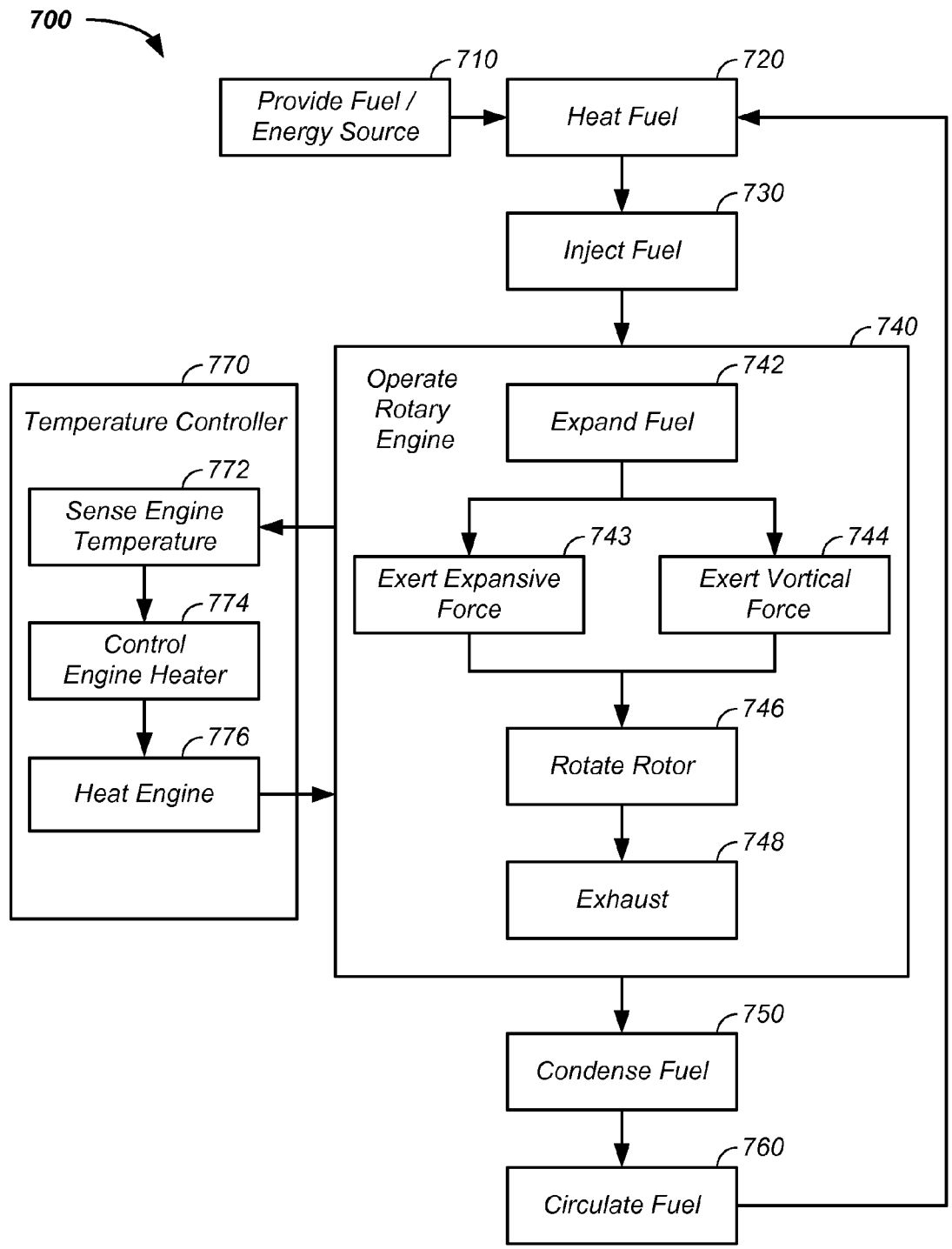
FIG. 7 provides a method of use of the rotary engine system.

Referring now to FIG. 7, a flow chart of a process 700 for the operation of rotary engine system 100 in accordance a preferred embodiment is described. Process 700 describes the operation of rotary engine 110.

Initially, a fuel and/or energy source is provided 710. The fuel is optionally from the external energy source 150. The energy source 150 is a source of: radiation, such as solar; vibration, such as an acoustical energy; and/or heat, such as convection. Optionally the fuel is from an external combustion chamber 154 or a waste heat source, such as from a power plant, or from the rotary engine 100.

Throughout operation process 700, a first parent task circulates the fuel 760 through a closed loop or an open loop. The closed loop cycles sequentially through: heating the fuel 720; injecting the fuel 730 into the rotary engine 110; expanding the fuel 742 in the reference expansion chamber; one or both of exerting an expansive force 743 on the double offset rotor 440 and exerting a vortical force 744 on the double offset rotor 440; rotating the rotor 746 to drive an external process, described infra; exhausting the fuel 748; condensing the fuel 750, and repeating the process of circulating the fuel 760. Preferably, the external energy source 150 provides the energy necessary in the heating the fuel step 720. Individual steps in the operation process are further described, infra.

Throughout the operation process 700, an optional second parent task maintains temperature 770 of at least one rotary engine 110 component. For example, a sensor senses engine temperature 772 and provides the temperature input to a controller of engine temperature 774. The controller directs or controls a heater 776 to heat the engine component. Preferably, the temperature controller 770 heats at least the first expansion chamber 335 to an operating temperature in excess of the vapor-point temperature of the fuel. Preferably, at least the first three expansion chambers 335, 345, 355 are maintained at an operating temperature exceeding the vapor-point of the fuel throughout operation of the rotary engine system 100. Preferably, the fluid heater 140 is simultaneously heating the fuel to a temperature proximate but less than the vapor-point temperature of fluid. Hence, when the fuel is injected through the injector 160 into the first expansion chamber 335, the fuel flash vaporizes exerting expansive force 743 and starts to rotate due to reference chamber geometry and rotation of the rotor to form the vortical force 744.

The fuel is optionally any fuel that expands into a vapor, gas, and/or gas-vapor mix where the expansion of the fuel releases energy used to drive the double offset rotor 440. The fuel is preferably a liquid component and/or a fluid that phase changes to a vapor phase at a very low temperature and has a significant vapor expansion characteristic. Fuels and energy sources are further described, infra.

In task 720, the fluid heater 140 preferably superheats the fuel to a temperature greater than or equal to a vapor-point temperature of the fuel. For example, if a plasmatic fluid is used as the fuel, the fluid heater 140 heats the plasmatic fluid to a temperature greater than or equal to a vapor-point temperature of the plasmatic fluid.

In a task 730, the injector 160 injects the heated fuel, via an inlet port 162, into the reference cell, which is the first expansion chamber 335 at time of fuel injection into the rotary engine 110. When the fuel is superheated, the fuel flash-vaporizes and expands 742, which exerts one of more forces on the double offset rotor 440. A first force is an expansive force 743 resultant from the phase change of the fuel from predominantly a liquid phase to substantially a vapor and/or gas phase. The expansive force acts on the double offset rotor 440 as described, supra, and is represented by force, F, in FIG. 4 and is illustratively represented as expansive force vectors 620 in FIG. 6. A second force is a vortical force 744 exerted on the double offset rotor 440. The vortical force 744 is resultant of geometry of the reference cell, which causes a vortex or rotational movement of the fuel in the chamber based on the geometry of the injection port, rotor chamber face 442 of the double offset rotor 440, inner wall of the housing 210, first end plate 212, second end plate 214, and the extended vane 450 and is illustratively represented as vortex force vectors 625 in FIG. 6. A third force is a hydraulic force of the fuel pushing against the leading vane as the inlet preferably forces the fuel into the leading vane upon injection of the fuel 730. A fourth force results from passage of the fuel through a passageway in the rotary engine 100 resulting in an electromagnetically generated field or force. The hydraulic force exists early in the power stroke before the fluid is flash-vaporized. All of the hydraulic force, the expansive force vectors 620, vortex force vectors 625, and/or electromagnetic force optionally simultaneously exist in the reference cell, in the first expansion chamber 335, second expansion chamber 345, and third expansion chamber 355.

When the fuel is introduced into the reference cell of the rotary engine 110, the fuel begins to expand hydraulically and/or about adiabatically in a task 740. The expansion of the fuel in the reference cell begins the power stroke or power cycle of the engine, described infra. In a task 746, the hydraulic and about adiabatic expansion of fuel exerts the expansive force 743 upon a leading vane 450 or upon the surface of the vane 450 proximate or bordering the reference cell in the direction of rotation 390 of the double offset rotor 440. Simultaneously, in a task 744, a vortex generator, generates a vortex 625 within the reference cell, which exerts a vortical force 744 upon the leading vane 450. The vortical force 744 adds to the expansive force 743 and contributes to rotation 390 of rotor 450 and shaft 220. Alternatively, either the expansive force 743 or vortical force 744 causes the leading vane 450 to move in the direction of rotation 390 and results in rotation of the rotor 746 and shaft 220. Examples of a vortex generator include: an aerodynamic fin, a vapor booster, a vane wingtip, expansion chamber geometry, valving, inlet port 162 orientation, an exhaust port booster, and/or power shaft injector inlet.

The about adiabatic expansion resulting in the expansive force 743 and the generation of a vortex resulting in the vortical force 744 continue throughout the power cycle of the rotary engine, which is nominally complete at about the six o'clock position of the reference cell. Thereafter, the reference cell decreases in volume, as in the first reduction chamber 365, second reduction chamber 375, and third reduction chamber 385. In a task 748, the fuel is exhausted or released 748 from the reference cell, such as through exhaust grooves cut through the housing 210, first end plate 212, and/or second end plate 214 at or about the seven o'clock to ten o'clock position and optionally at about a six, seven, eight, nine, or ten o'clock position. The exhausted fuel is optionally discarded in a non-circulating system. Preferably, the exhausted fuel is condensed 750 to liquid form in the condenser 120, optionally stored in the reservoir 130, and recirculated 760, as described supra.

Fuel

Fuel is optionally any liquid or liquid/solid mixture that expands into a vapor, vapor-solid, gas, gas-solid, gas-vapor, gas-liquid, gas-vapor-solid mix where the expansion of the fuel releases energy used to drive the double offset rotor 440. The fuel is preferably substantially a liquid component and/or a fluid that phase changes to a vapor phase at a very low temperature and has a significant vapor expansion characteristic. Additives into the fuel and/or mixtures of fuels include any permutation and/or combination of fuel elements described herein. A first example of a fuel is any fuel that both phase changes to a vapor at a very low temperature and has a significant vapor expansion characteristic for aid in driving the double offset rotor 440, such as a nitrogen and/or an ammonia based fuel. A second example of a fuel is a diamagnetic liquid fuel. A third example of a fuel is a liquid having a permeability of less than that of a vacuum and that has an induced magnetism in a direction opposite that of a ferromagnetic material. A fourth example of a fuel is a fluorocarbon, such as Fluorinert liquid FC-77® (3M, St. Paul, Minn.), 1,1,1,3,3-pentafluoropropane, and/or Genetron® 245fa (Honeywell, Morristown, N.J.). A fifth example of a fuel is a plasmatic fluid composed of a non-reactive liquid component to which a solid component is added. The solid component is optionally a particulate held in suspension within the liquid component. Preferably the liquid and solid components of the fuel have a low coefficient of vaporization and a high heat transfer characteristic making the plasmatic fluid suitable for use in a closed-loop engine with moderate operating temperatures, such as below about 400° C. (750° F.) at moderate pressures. The solid component is preferably a particulate paramagnetic substance having non-aligned magnetic moments of the atoms when placed in a magnetic field and that possess magnetization in direct proportion to the field strength. An example of a paramagnetic solid additive is powdered magnetite ($Fe_3O_4$) or a variation thereof. The plasmatic fluid optionally contains other components, such as an ester-based fuel lubricant, a seal lubricant, and/or an ionic salt. The plasmatic fluid preferably comprises a diamagnetic liquid in which a particulate paramagnetic solid is suspended as when the plasmatic fluid is vaporized the resulting vapor carries a paramagnetic charge, which sustains an ability to be affected by an electromagnetic field. That is, the gaseous form of the plasmatic fluid is a current carrying plasma and/or an electromagnetically responsive vapor fluid. The exothermic release of chemical energy of the fuel is optionally used as a source of power.

The fuel is optionally an electromagnetically responsive fluid and/or vapor. For example, the electromagnetically responsive fuel contains a salt and/or a paramagnetic material.

The engine system 100 is optionally run in either an open loop configuration or a closed loop configuration. In the open loop configuration, the fuel is consumed and/or wasted. In the closed loop system, the fuel is consumed and/or recirculated.

Power Stroke

The power stroke of the rotary engine 110 occurs when the fuel is expanding exerting the expansive force 743 and/or is exerting the vortical force 744. In a first example, the power stroke occurs from through about the first one hundred eighty degrees of rotation, such as from about the twelve o'clock position to the about six o'clock position. In a second example, the power stroke or a power cycle occurs through about 360 degrees of rotation. In a third example, the power stroke occurs from when the reference cell is in approximately the one o'clock position until when the reference cell is in approximately the six o'clock position. From the one o'clock to six o'clock position, the reference cell preferably continuously increases in volume. The increase in volume allows energy to be obtained from the combination of vapor hydraulics, adiabatic expansion forces 743, the vortical forces 744, and/or electromagnetic forces as greater surface areas on the leading vane are available for application of the applied force backed by simultaneously increasing volume of the reference cell. To maximize use of energy released by the vaporizing fuel, preferably the curvature of housing 210 relative to the rotor 450 results in a radial cross-sectional distance or a radial cross-sectional area that has a volume of space or cross-sectional area within the reference cell that increases at about a golden ratio, $\phi$, as a function of radial angle. The golden ratio is defined as a ratio where the lesser is to the greater as the greater is to the sum of the lesser plus the greater, equation 2.

$$\frac{a}{b} = \frac{b}{a+b} \quad \text{(eq. 2)}$$

Assuming the lesser, a, to be unity, then the greater, b, becomes $\theta$, as calculated in equations 3 to 5.

$$\frac{1}{\phi} = \frac{\phi}{1+\phi} \quad \text{(eq. 3)}$$

$$\phi^2 = \phi + 1 \quad \text{(eq. 4)}$$

$$\phi^2 - \phi - 1 = 0 \quad \text{(eq. 5)}$$

Using the quadratic formula, limited to the positive result, the golden ratio is about 1.618, which is the Fibonacci ratio, equation 6.

$$\phi = \frac{1+\sqrt{5}}{2} \cong 1.618033989 \quad \text{(eq. 6)}$$

Hence, the cross-sectional area of the reference chamber as a function of rotation or the surface area of the leading vane 450 as a function of rotation is preferably controlled by geometry of the rotary engine 110 to increase at a ratio of about 1.4 to 1.8 and more preferably to increase with a ratio of about 1.5 to 1.7, and still more preferably to increase at a ratio of about 1.618 through any of the power stroke from the one o'clock to about six o'clock position. The ratio is controlled by a combination of one or more of use of: the double offset rotor geometry 400, use of the first cut-out 510 in the housing 210, use of the build-up 610 in the housing 210, and/or use of the second cut-out 520 in the housing. Further, the fuels described maintain about adiabatic expansion to a high ratio of gas/liquid when maintained at a relatively constant temperature by the temperature controller 770.

Expansion Volume

Figure 8:
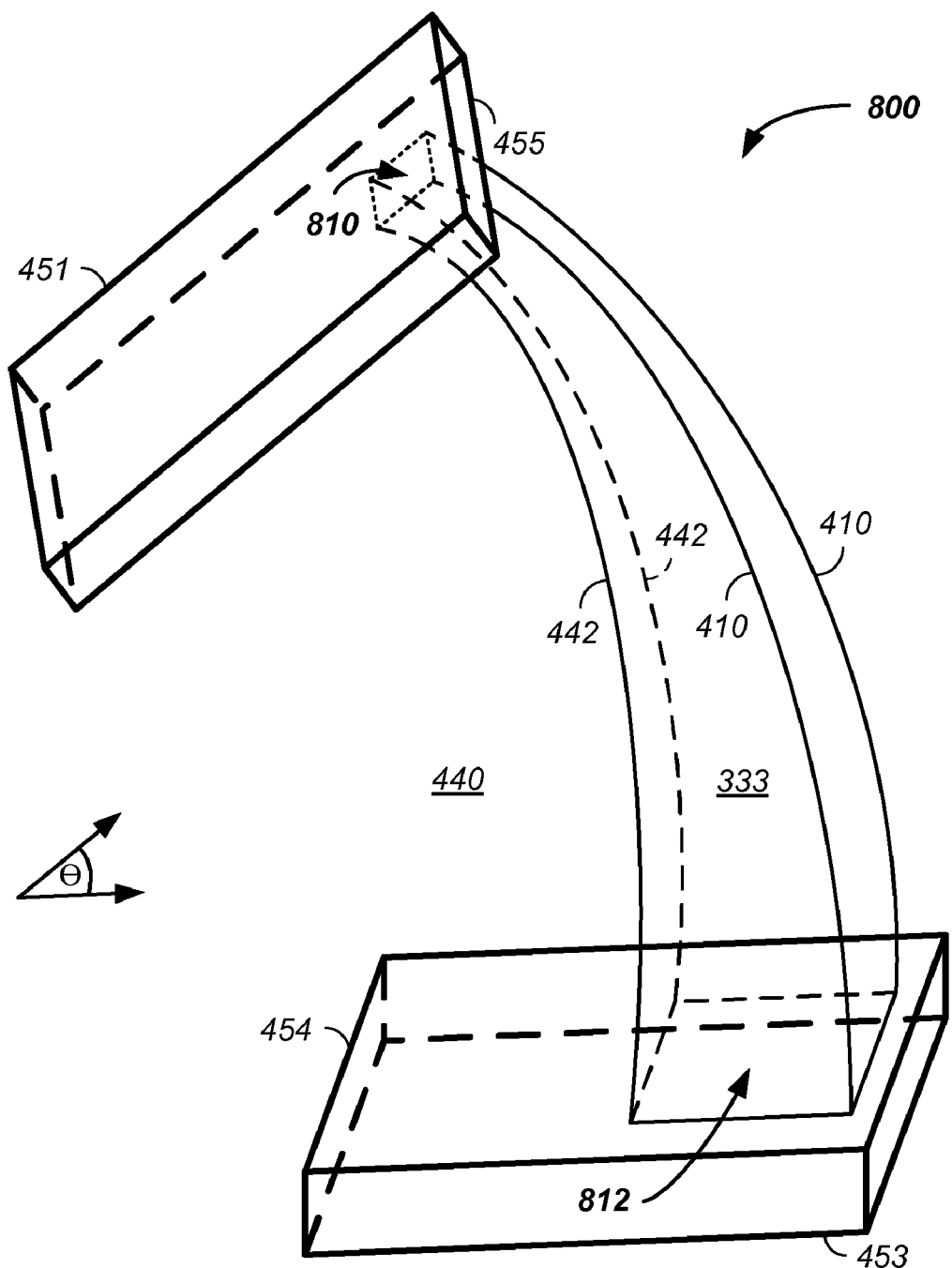
FIG. 8 illustrates an expanding expansion chamber with rotor rotation.
Figure 9:
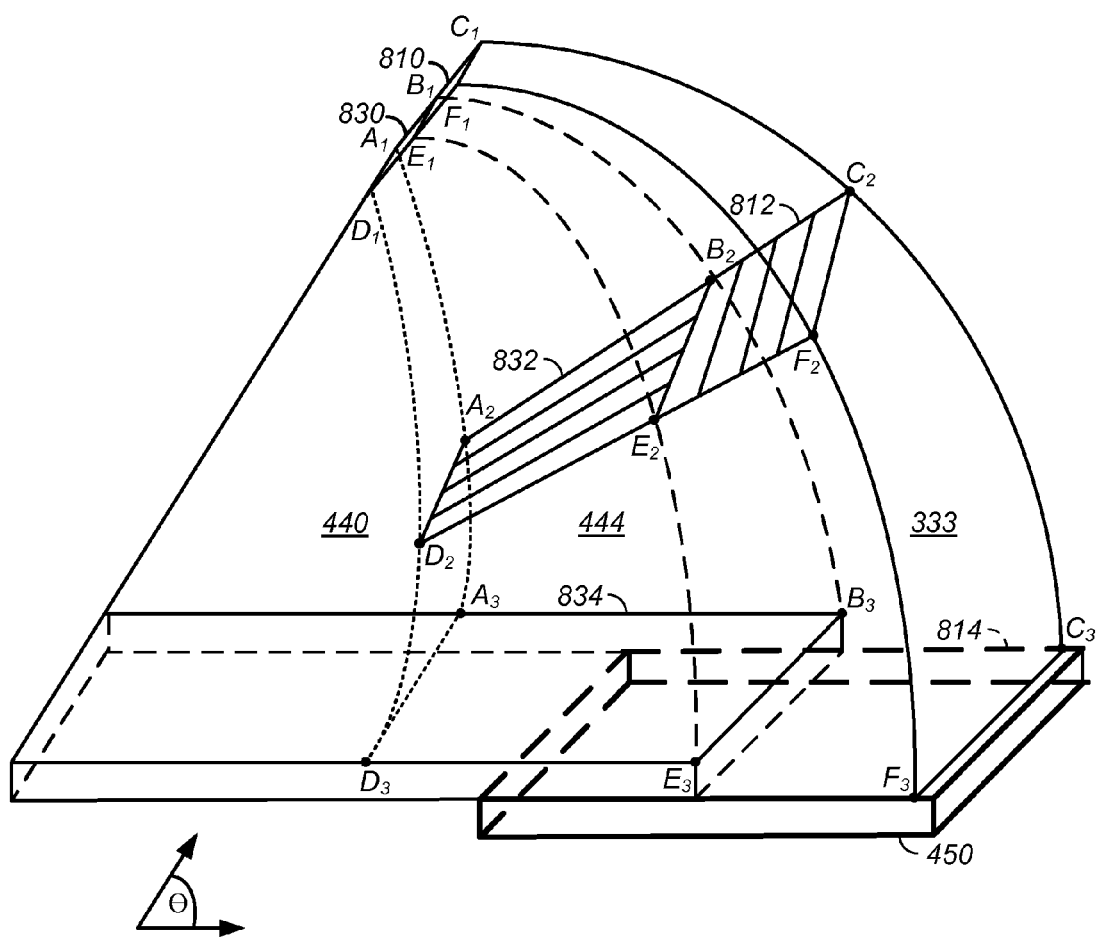
FIG. 9 illustrates an expanding concave expansion chamber with rotor rotation.

Referring now to FIG. 8 and FIG. 9, an expansion volume of a chamber 800 preferably increases as a function of radial angle through the power stroke/expansion phase of the expansion chamber of the rotary engine, such as from about the twelve o'clock position through about the six o'clock position, where the radial angle, θ, is defined by two hands of a clock having a center in the rotor 440. Illustrative of a chamber volume, the expansion chamber 333 is illustrated between: an outer rotor surface 442 of the rotor 440, the inner wall of the housing 410, a trailing vane 451, and a leading vane 453. The trailing vane 451 has a trailing vane chamber side 455 and the leading vane 453 has a leading vane chamber side 454. It is observed that the expansion chamber 333 has a smaller interface area 810, $A_1$, with the trailing vane chamber side 455 and a larger interface area 812, $A_2$, with the leading vane chamber side 454. Fuel expansion forces applied to the rotating vanes 451, 453 are proportional to the interface area. Thus, the trailing vane interface area 810, $A_1$, experiences expansion force one, $F_1$, and the leading vane interface area 812, $A_2$, experience expansion force two, $F_2$. Hence, the net rotational force, $F_T$, is the difference in the forces, according to equation 7.

$$F_T \cong F_2 - F_1 \tag{eq. 7}$$

The force calculation according to equation 7 is an approximation and is illustrative in nature. However, it is readily observed that the net turning force in a given expansion chamber is the difference in expansive force applied to the leading vane 453 and the trailing vane 451. Hence, the use of the any of: the single offset rotary engine 300, the double offset rotary engine 400, the first cutout 510, the build-up 610, and/or the second cutout 520, which allow a larger cross-section of the expansion chamber as a function of radial angle yields more net turning forces on the rotor 440. Referring still to FIG. 9, to further illustrate, the cross-sectional area of the expansion volume 333 described in FIG. 8 is illustrated in FIG. 9 at three radial positions. In the first radial position, the cross-sectional area of the expansion volume 333 is illustrated as the area defined by points $B_1$, $C_1$, $F_1$, and $E_1$. The cross-sectional area of the expansion chamber 333 is observed to expand at a second radial position as illustrated by points $B_2$, $C_2$, $F_2$, and $E_2$. The cross-sectional area of the expansion chamber 333 is observed to still further expand at a third radial position as illustrated by points $B_3$, $C_3$, $F_3$, and $E_3$. Hence, as described supra, the net rotational force turns the rotor 440 due to the increase in cross-sectional area of the expansion chamber 333 as a function of radial angle.

Referring still to FIG. 9, a rotor cutout expansion volume is described that yields a yet larger net turning force on the rotor 440. As illustrated in FIG. 3, the outer surface of rotor 320 is circular. As illustrated in FIG. 4, the outer surface of the rotor 442 is optionally geometrically shaped to increase the distance between the outer surface of the rotor and the inner wall of the housing 420 as a function of radial angle through at least a portion of an expansion chamber 333. Optionally, the rotor 440 has an outer surface proximate the expansion chamber 333 that is concave. Preferably, the outer wall of rotor 440 includes walls next to each of: the end plates 212, 214, the trailing edge of the rotor, and the leading edge of the rotor. The concave rotor chamber is optionally described as a rotor wall cavity, a 'dug-out' chamber, or a chamber having several sides partially enclosing an expansion volume larger than an expansion chamber having an inner wall of a circular rotor. The 'dug-out' volume optionally increases as a function of radial angle within the reference expansion cell, illustrated as the expansion chamber or expansion cell 333. Referring still to FIG. 9, the 'dug-out' rotor 444 volume of the rotor 440 is observed to expand with radial angle theta, θ, and is illustrated at the same three radial angles as the expansion volume cross-sectional area. In the first radial position, the cross-section of the 'dug-out' rotor 444 volume is illustrated as the area defined by points $A_1$, $B_1$, $E_1$, and $D_1$. The cross-sectional area of the 'dug-out' rotor 444 volume is observed to expand at the second radial position as illustrated by points $A_2$, $B_2$, $E_2$, and $D_2$. The cross-sectional area of the 'dug-out' rotor 444 is observed to still further expand at the third radial position as illustrated by points $A_3$, $B_3$, $E_3$, and $D_3$. Hence, as described supra, the rotational forces applied to the leading rotor surface exceed the forces applied to the trailing rotor edge yielding a net expansive force applied to the rotor 440, which adds to the net expansive forces applied to the vane, $F_T$, which turns the rotor 440. The 'dug-out' rotor 444 volume is optionally machined or cast at time of rotor creation and the term 'dug-out' is descriptive in nature of shape, not of a creation or manufacture process of the dug-out rotor 444.

The overall volume of the expansion chamber 333 is increased by removing a portion of the rotor 440 to form the dug-out rotor. The increase in the overall volume of the expansion chamber using a dug-out rotor enhances rotational force of the rotary engine 110 and/or efficiency of the rotary engine.

Vane Seals/Valves

Seals

Figure 10:
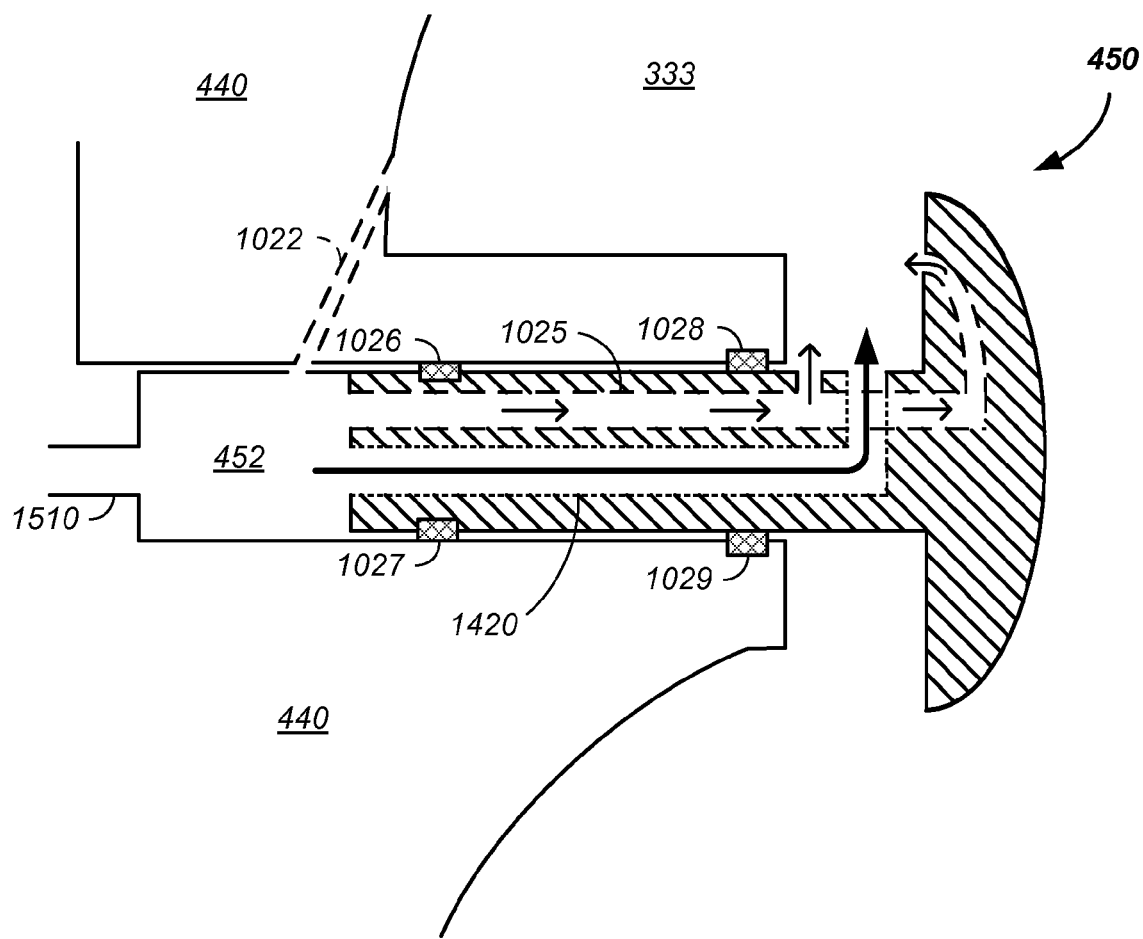
FIG. 10. illustrates a vane.

Referring now to FIG. 10, an example of a vane 450 is provided. Preferably, the vane 450 includes about six seals, including: a lower trailing vane seal 1026, a lower leading seal 1027, an upper trailing seal 1028, an upper leading seal 1029, an inner seal, and/or an outer seal. The lower trailing seal 1026 and lower leading seal 1028 are (1) attached to the vane 450 and (2) move or slide with the vane 450. The upper trailing seal 1028 and upper leading seal 1029 are preferably (1) attached to the rotor 440 and (2) do not move relative to the rotor 440 as the vane 450 moves. Both the lower trailing seal 1026 and upper trailing seal 1028 optionally operate as valves, as described infra. Each of the seals 1026, 1027, 1028, 1029 restrict and/or stop expansion of the fuel between the rotor 440 and vane 450.

Fuel Routing/Valves

Still referring to FIG. 10, in another embodiment, gas or fluid fuels are routed from an expansion chamber 333 into one or more rotor conduits 1020 leading from the expansion chamber 333 to the rotor-vane chamber or rotor-vane slot 452 on a shaft 220 side of the vane 450 in the rotor guide. The expanding fuel optionally runs through the rotor 440, to the rotor channel guiding a vane 452, into the vane 450, and/or a into a tip of the vane 450. Fuel routing paths additionally optionally run through the shaft 220 of the rotary engine 110, through piping, and into the rotor-vane chamber 452.

Figure 11:
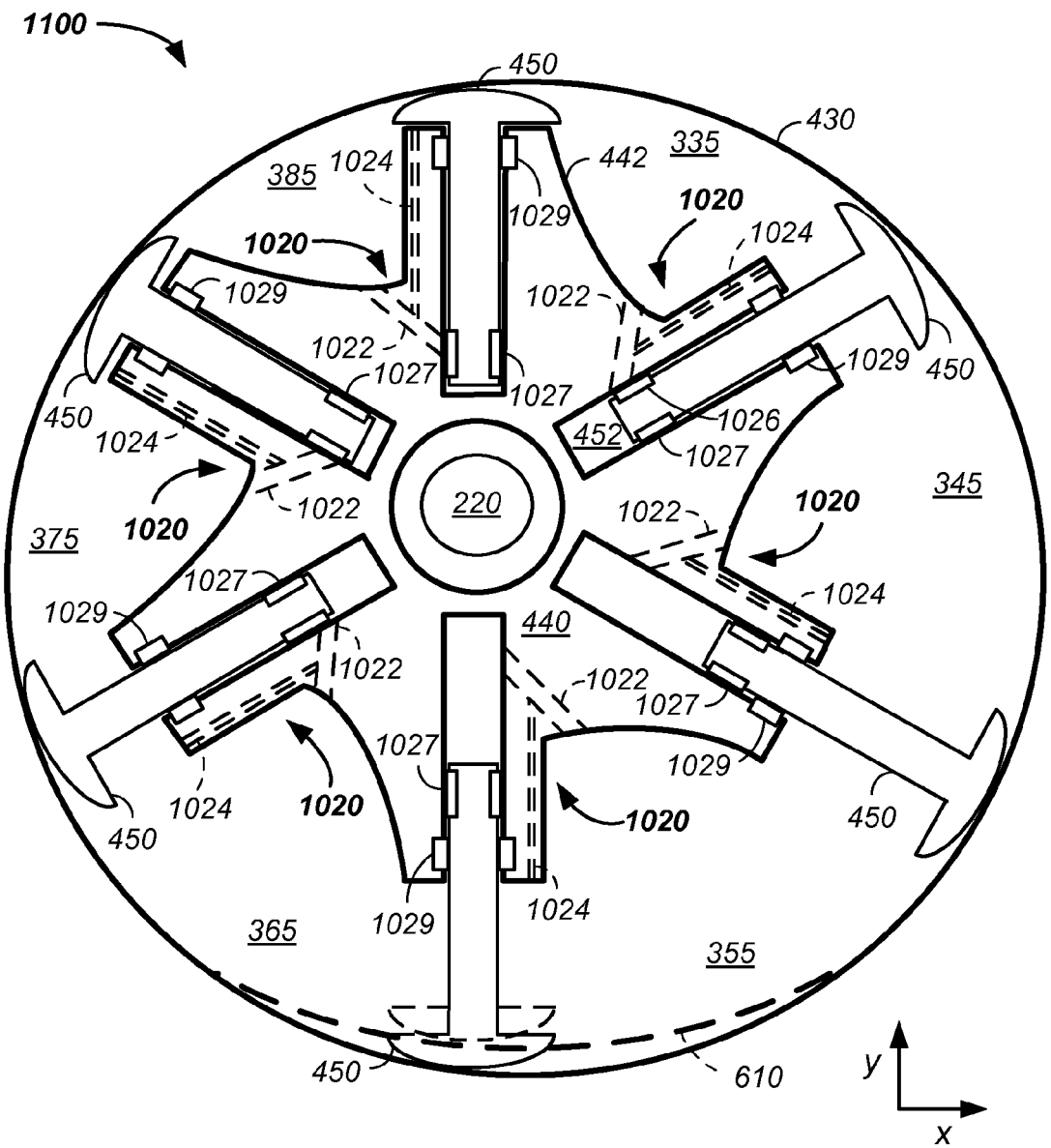
FIG. 11 illustrates a rotor having valving.

Referring now to FIG. 11, an example of a rotor 440 having fuel routing paths 1100 is provided. The fuel routing paths, valves, and seals are all optional. Upon expansion and/or flow, fuel in the expansion chamber 333 enters into a first rotor conduit, tunnel, or fuel pathway 1022 running from the expansion chamber 333 or rotor dug-out chamber 444 to the rotor-vane chamber 452. The rotor-vane chamber 452: (1) aids in guiding movement of the vane 450 and (2) optionally provides a partial containment chamber for fuel from the expansion chamber 333 as described herein and/or as a partial containment chamber from fuel routed through the shaft 220, as described infra.

In an initial position of the rotor 440, such as for the first expansion chamber at about the two o'clock position, the first rotor conduit 1022 terminates at the lower trailing vane seal 1026, which prevents further expansion and/or flow of the fuel through the first rotor conduit 1022. Stated again, the lower trailing vane seal 1026 functions as a valve that is off or closed in the two o'clock position and on or open at a later position in the power stroke of the rotary engine 110, as described infra. The first rotor conduit 1022 optionally runs from any portion of the expansion chamber 333 to the rotor vane guide, but preferably runs from the expansion chamber dug-out volume 444 of the expansion chamber 333 to an entrance port either sealed by lower trailing vane seal 1026 or through an opening into the rotor vane guide or rotor-vane chamber 452 on an inner radial side of the vane 450, which is the side of the vane closest to the shaft 220. The cross-sectional geometry of the first rotor conduit 1022 is preferably circular, but is optionally of any geometry. An optional second rotor conduit 1024 runs from the expansion chamber to the first rotor conduit 1022. Preferably, the first rotor conduit 1022 includes a cross-sectional area at least twice that of a cross-sectional area of the second rotor conduit 1024. The intersection of the first rotor conduit 1022 and second rotor conduit 1024 is further described, infra.

As the rotor 440 rotates, such as to about the four o'clock position, the vane 450 extends toward the inner wall of the housing 430. As described supra, the lower trailing vane seal 1026 is preferably affixed to the vane 450 and hence moves, travels, translates, and/or slides with the vane. The extension of the vane 450 results in outward radial movement of the lower vane seals 1026, 1027. Outward radial movement of the lower trailing vane seal 1026 opens a pathway, such as opening of a valve, at the lower end of the first rotor conduit 1022 into the rotor-vane chamber 452 or the rotor guiding channel on the shaft 220 side of the vane 450. Upon opening of the lower trailing vane seal or valve 1026, the expanding fuel enters the rotor vane chamber 452 behind the vane and the expansive forces of the fuel aid centrifugal forces in the extension of the vane 450 toward the inner wall of the housing 430. The lower vane seals 1026, 1027 hinder and preferably stop flow of the expanding fuel about outer edges of the vane 450. As described supra, the upper trailing vane seal 1028 is preferably affixed to the rotor 440, which results in no movement of the upper vane seal 1028 with movement of the vane 450. The optional upper vane seals 1028, 1029 hinder and preferably prevent direct fuel expansion from the expansion chamber 333 into a region between the vane 450 and rotor 440.

As the rotor 440 continues to rotate, the vane 450 maintains an extended position keeping the lower trailing vane seal 1028 in an open position, which maintains an open aperture at the terminal end of the first rotor conduit 1022. As the rotor 440 continues to rotate, the inner wall 430 of the housing forces the vane 450 back into the rotor guide, which forces the lower trailing vane seal 1026 to close or seal the terminal aperture of the first rotor conduit 1022.

During a rotation cycle of the rotor 440, the first rotor conduit 1022 provides a pathway for the expanding fuel to push on the back or rotationally trailing side of the vane 450 during the power stroke. The moving lower trailing vane seal 1026 functions as a valve opening the first rotor conduit 1022 near the beginning of the power stroke and further functions as a valve closing the rotor conduit 1022 pathway near the end of the power stroke.

Concurrently, the upper trailing vane seal 1028 functions as a second valve. The upper trailing vane seal 1028 valves an end of the vane conduit 1025 proximate the expansion chamber 333. For example, at about the ten o'clock and twelve o'clock positions, the upper trailing vane seal 1028 functions as a closed valve to the vane conduit 1025. Similarly, in the about four o'clock and six o'clock positions, the upper trailing vane seal functions as an open valve to the vane conduit 1025.

Optionally, the expanding fuel is routed through at least a portion of the shaft 220 to the rotor-vane chamber 452 in the rotor guide on the inner radial side of the vane 450, as discussed infra.

Vane Conduits

Figure 12:
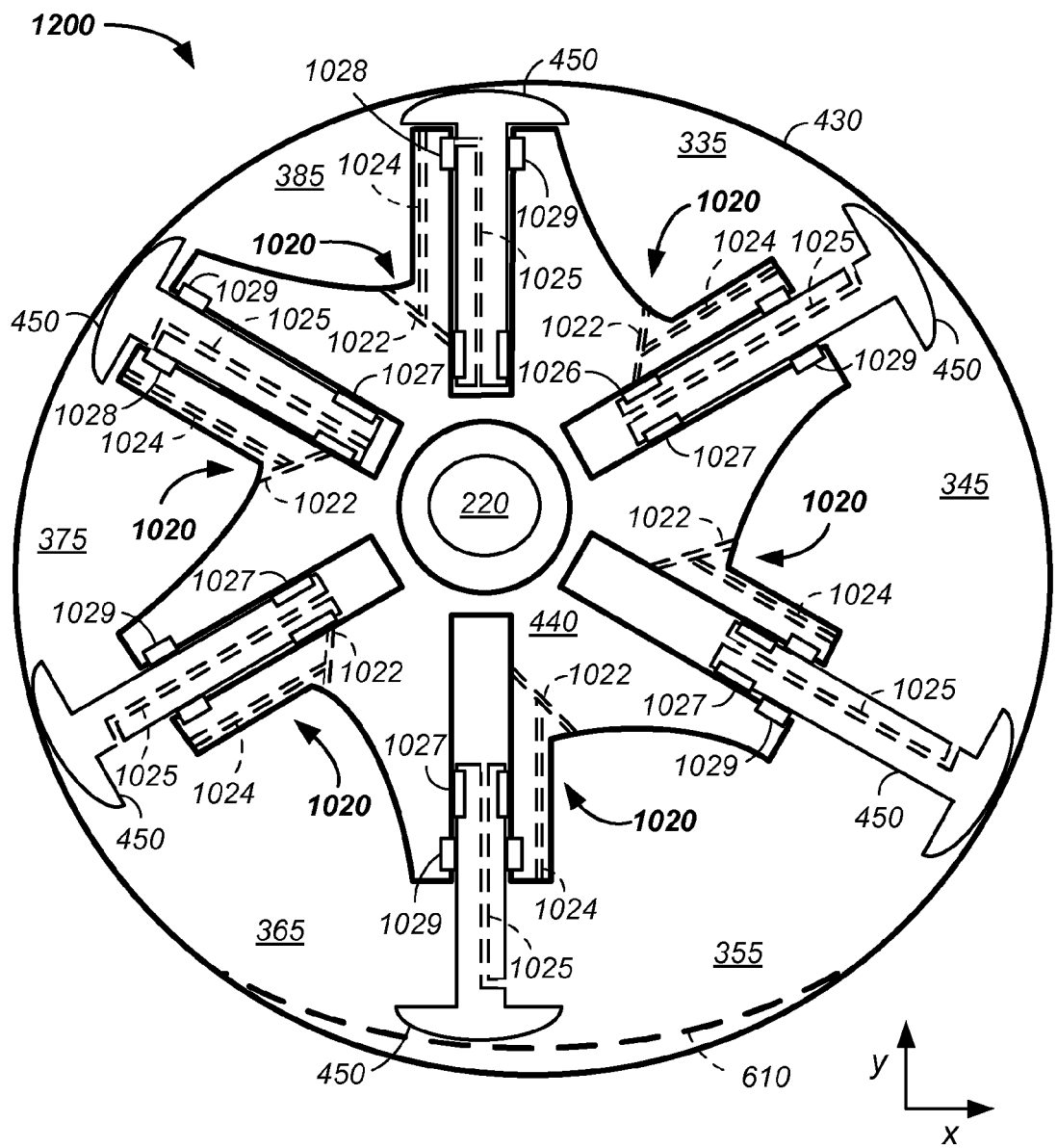
FIG. 12 illustrates a rotor and vanes having fuel paths.

Referring now to FIG. 12, in yet another embodiment the vane 450 includes a fuel conduit 1200. In this embodiment, expanding fuel moves from the rotor-vane chamber 452 in the rotor guide at the inner radial side of the vane 450 into one or more vane conduits. Preferably 2, 3, 4 or more vane conduits are used in the vane 450. For clarity, a single vane conduit is used in this example. The single vane conduit, first vane conduit 1025, runs about longitudinally along at least fifty percent of the length of the vane 450 and terminates along a trailing edge of the vane 450 into the expansion chamber 333. Hence, fuel runs and/or expands sequentially: from the inlet port 162, through the expansion chamber 333, through a rotor conduit 1020, such as the first rotor conduit 1022 and/or second rotor conduit 1024, to the rotor-vane chamber 452 at the inner radial side of the vane 450, through a portion of the vane in the first vane conduit 1025, and exits or returns into the same expansion chamber 333. The exit of the first vane conduit 1025 from the vane 450 back to the expansion chamber 333 or trailing expansion chamber is optionally through a vane exit port on the trailing edge of the vane and/or through a trailing portion of the T-form vane head. The expanding fuel exiting the vane provides a rotational force aiding in rotation 390 of the rotor 450 about the shaft 220. The upper trailing vane seal 1028 controls timing of opening and closing of a pressure equalization path between the expansion chamber 333 and the rotor vane chamber 452. Preferably, the exit port from the vane conduit to the trailing expansion chamber couples two vane conduits into a vane flow booster 1340. The vane flow booster 1340 is a species of a flow booster 1300, described infra. The vane flow booster 1340 uses fuel expanding and/or flowing a first vane flow channel to accelerate fuel expanding into the expansion chamber 333.

Flow Booster

Figure 13:
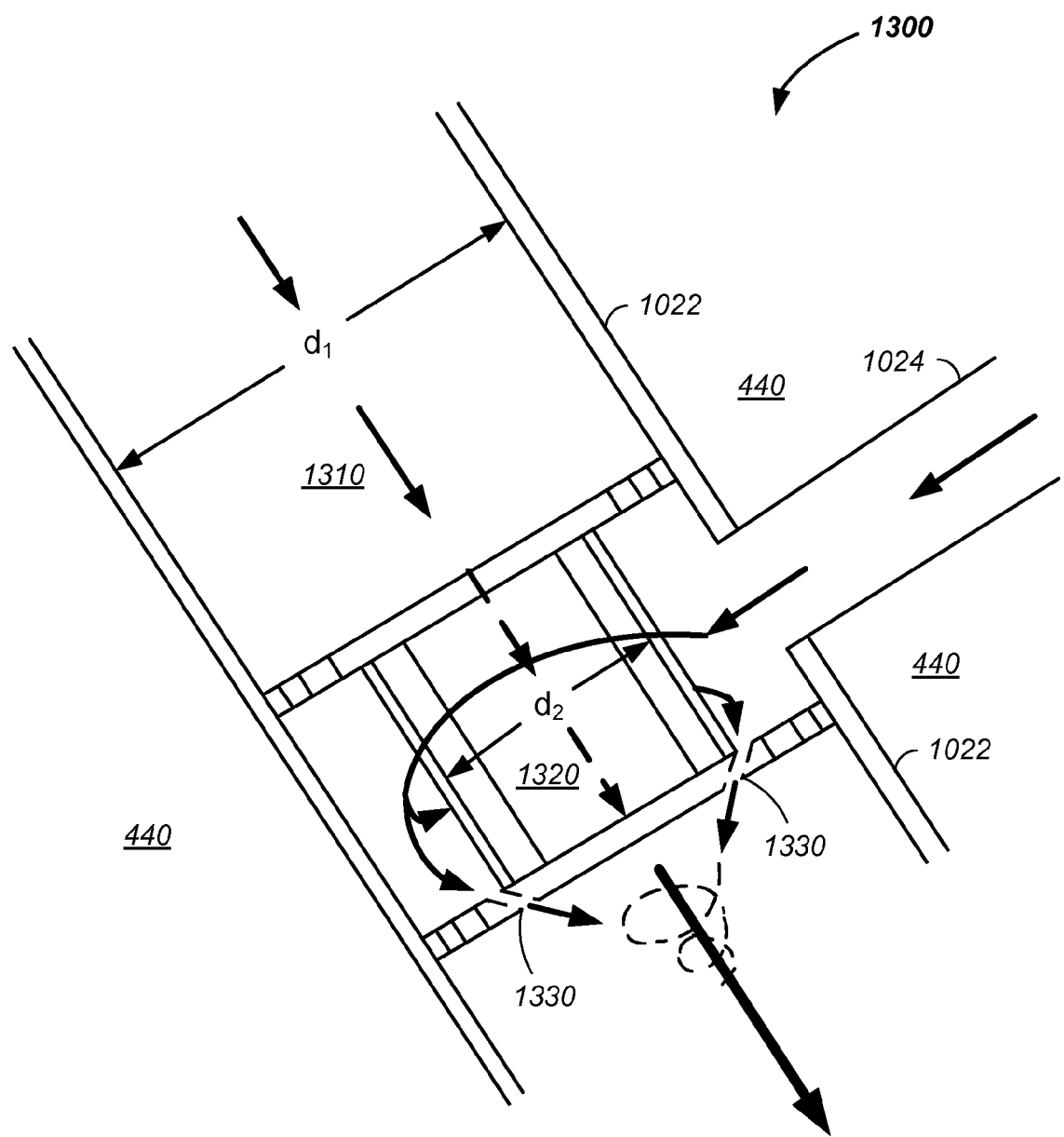
FIG. 13 illustrates a booster.

Referring now to FIG. 13, an optional flow booster 1300 or amplifier accelerates movement of the gas/fuel in the first rotor conduit 1022. In this description, the flow booster is located at the junction of the first rotor conduit 1022 and second rotor conduit 1024. However, the description applies equally to flow boosters located at one or more exit ports of the fuel flow path exiting the vane 450 into the trailing expansion chamber. In this example, fuel in the first rotor conduit 1022 optionally flows from a region having a first cross-sectional distance 1310, $d_1$, through a region having a second cross-sectional distance 1320, $d_2$, where $d_1 > d_2$. At the same time, fuel and/or expanding fuel flows through the second rotor conduit 1024 and optionally circumferentially encompassed an about cylindrical barrier separating the first rotor conduit 1022 from the second rotor conduit 1024. The fuel in the second rotor conduit 1024 passes through an exit port 1330 and mixes and/or forms a vortex with the fuel exiting out of the cylindrical barrier, which accelerates the fuel traveling through the first rotor conduit 1022.

Branching Vane Conduits

Figure 14:
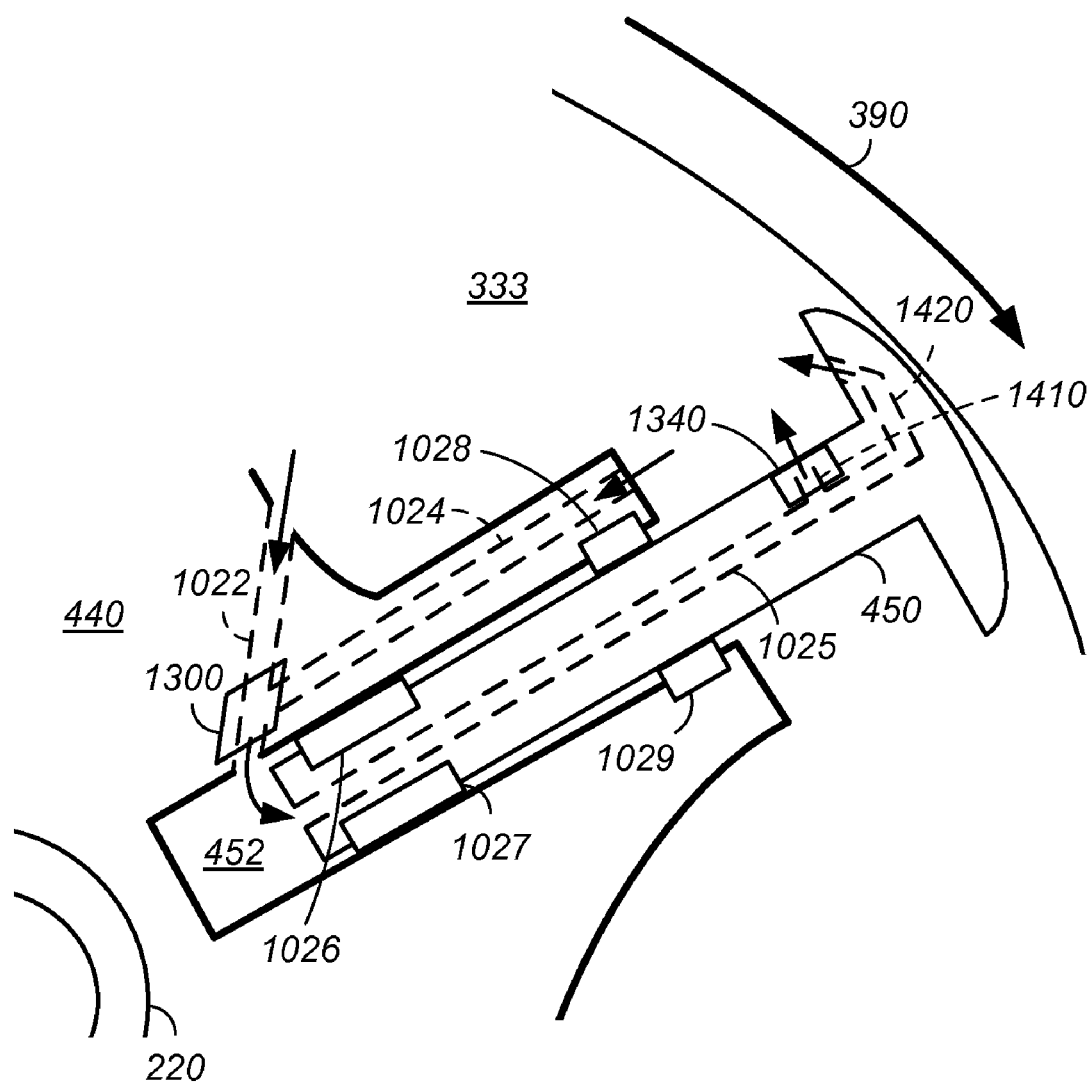
FIG. 14 illustrates a vane having multiple fuel paths.

Referring now to FIG. 14, in yet another embodiment, expanding fuel moves from the rotor-vane chamber 452 in the rotor guide at the inner radial side of the vane 450 into a branching vane conduit. For example, the first vane conduit 1025 runs about longitudinally along at least fifty percent of the length of the vane 450 and branches into at least two branching vanes, where each of the branching vanes exit the vane 450 into the trailing expansion chamber 333. For example, the first vane conduit 1025 branches into a first branching vane conduit 1410 and a second branching vane conduit 1420, which each exit to the trailing expansion chamber 333.

Multiple Fuel Lines

Figure 15A:
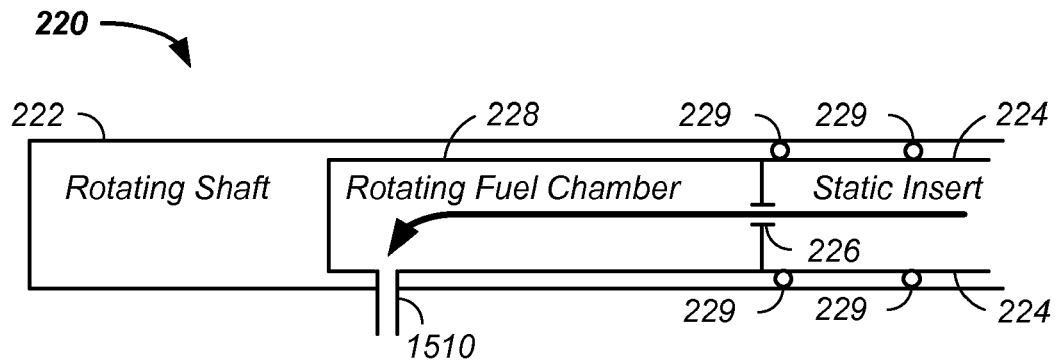
FIG. 15 illustrates a fuel path running through FIG. 15A a shaft and FIG. 15B into a vane.
Figure 15B:
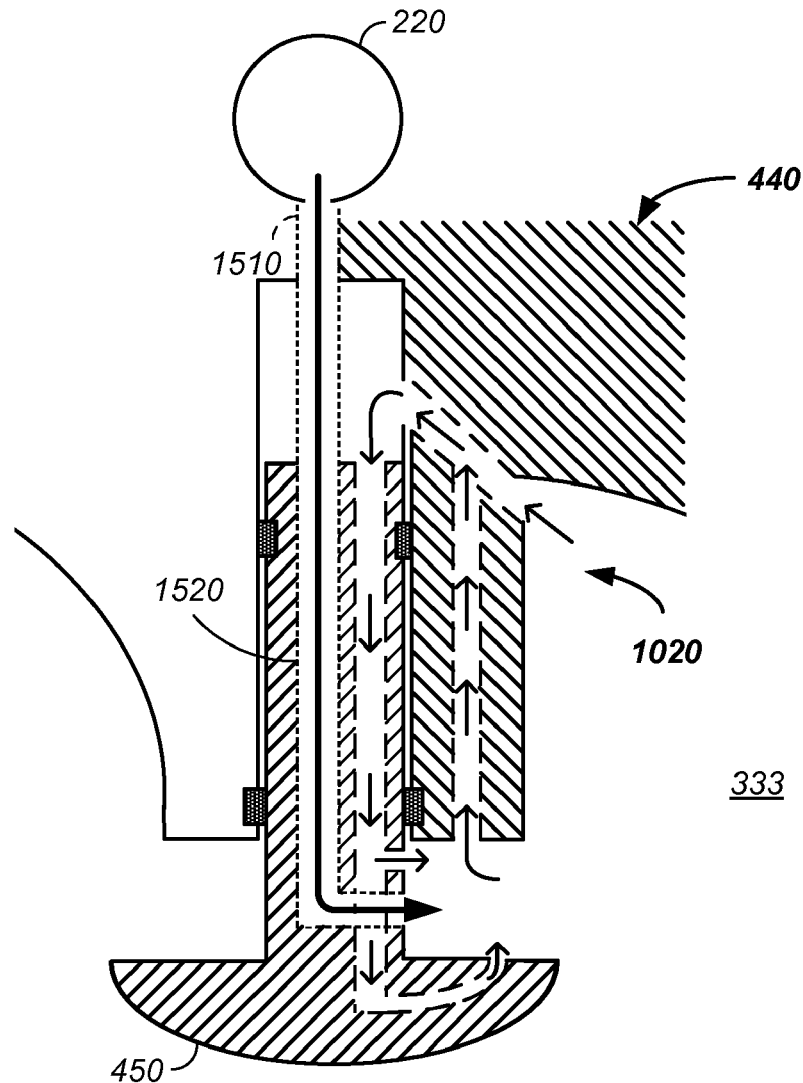

Referring now to FIG. 15, in still yet an additional embodiment, fuel additionally enters into the rotor-vane chamber 452 through as least a portion of the shaft 220. Referring now to FIG. 15A, a shaft 220 is illustrated. The shaft optionally includes an internal insert 224. The insert 224 remains static while wall 222 of the shaft 220 rotates about the insert 224 on one or more bearings 229. Fuel, preferably under pressure, flows from the insert 224 through an optional valve 226 into a fuel chamber 228, which rotates with the shaft wall 222. Referring now to FIG. 15B, a flow tube 1510, which rotates with the shaft wall 222 transports the fuel from the rotating fuel chamber 228 and optionally through the rotor-vane chamber 450 where the fuel enters into a vane conduit 1520, which terminates at the trailing expansion chamber 333. The pressurized fuel in the static insert 224 expands before entering the expansion chamber and the force of expansion and/or directional booster force of propulsion provides tortional force against the rotor 440 to force the rotor to rotate. Optionally, a second vane conduit is used in combination with a flow booster to enhance movement of the fuel into the expansion chamber adding additional expansion and directional booster forces. Upon entering the expansion chamber 333, the fuel may proceed to expand through any of the rotor conduits 1020, as described supra.

Vanes

Figure 16A:
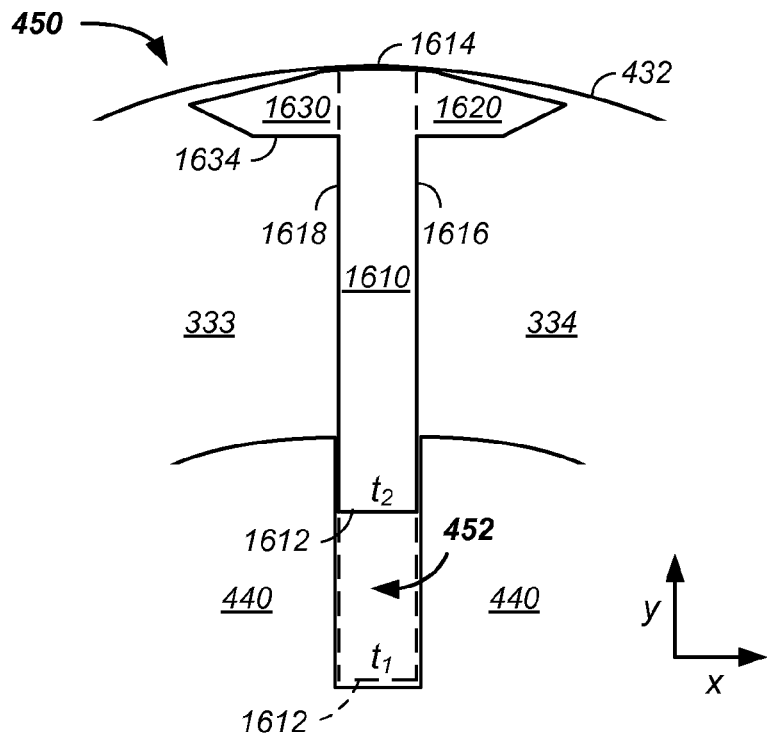
FIG. 16 illustrates a vane in a cross sectional view, FIG. 16A, and in a perspective view, FIG. 16B.
Figure 16B:
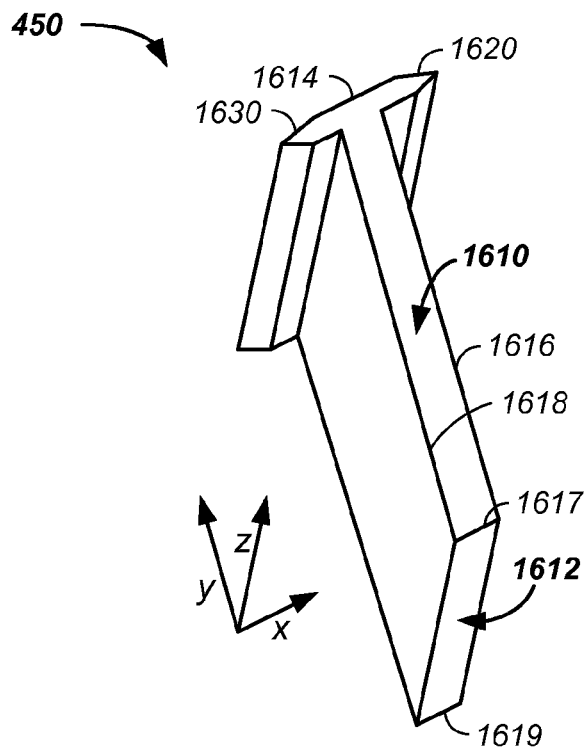

Referring now to FIG. 16A, a sliding vane 450 is illustrated relative to a rotor 440 and the inner wall 432 of the housing 210. The inner wall 432 is exemplary of the inner wall of any rotary engine housing. Referring still to FIG. 16A and now referring to FIG. 16B, the vane 450 is illustrated in a perspective view. The vane includes a vane body 1610 between a vane base 1612, and vane end 1614. The vane end 1614 is proximate the inner housing 432 during use. The vane 450 has a leading face 1616 proximate a leading chamber 334 and a trailing face 1618 proximate a trailing chamber or reference expansion chamber 333. In one embodiment, the leading face 1616 and trailing face 1618 of the vane 450 extend as about parallel edges, sides, or faces from the vane base 1612 to the vane end 1614. Optional vane wing tips or vane extensions are described, infra. Herein, the leading chamber 334 and reference expansion chamber 333 are both expansion chambers. The leading chamber 334 and reference expansion chamber 333 are chambers on opposite sides of a vane 450.

Vane Axis

The vanes 450 rotate with the rotor 440 about a rotation point and/or about the shaft 220. Hence, a localized axis system is optionally used to describe elements of the vane 450. For a static position of a given vane, an x-axis runs through the vane body 1610 from the trailing chamber or 333 to the leading chamber 334, a y-axis runs from the vane base 1612 to the vane end 1614, and a z-axis is normal to the x-, y-plane, such as defining the thickness of the vane. Hence, as the vane rotates, the axis system rotates and each vane has its own axis system at a given point in time.

Vane Head

Figure 17:
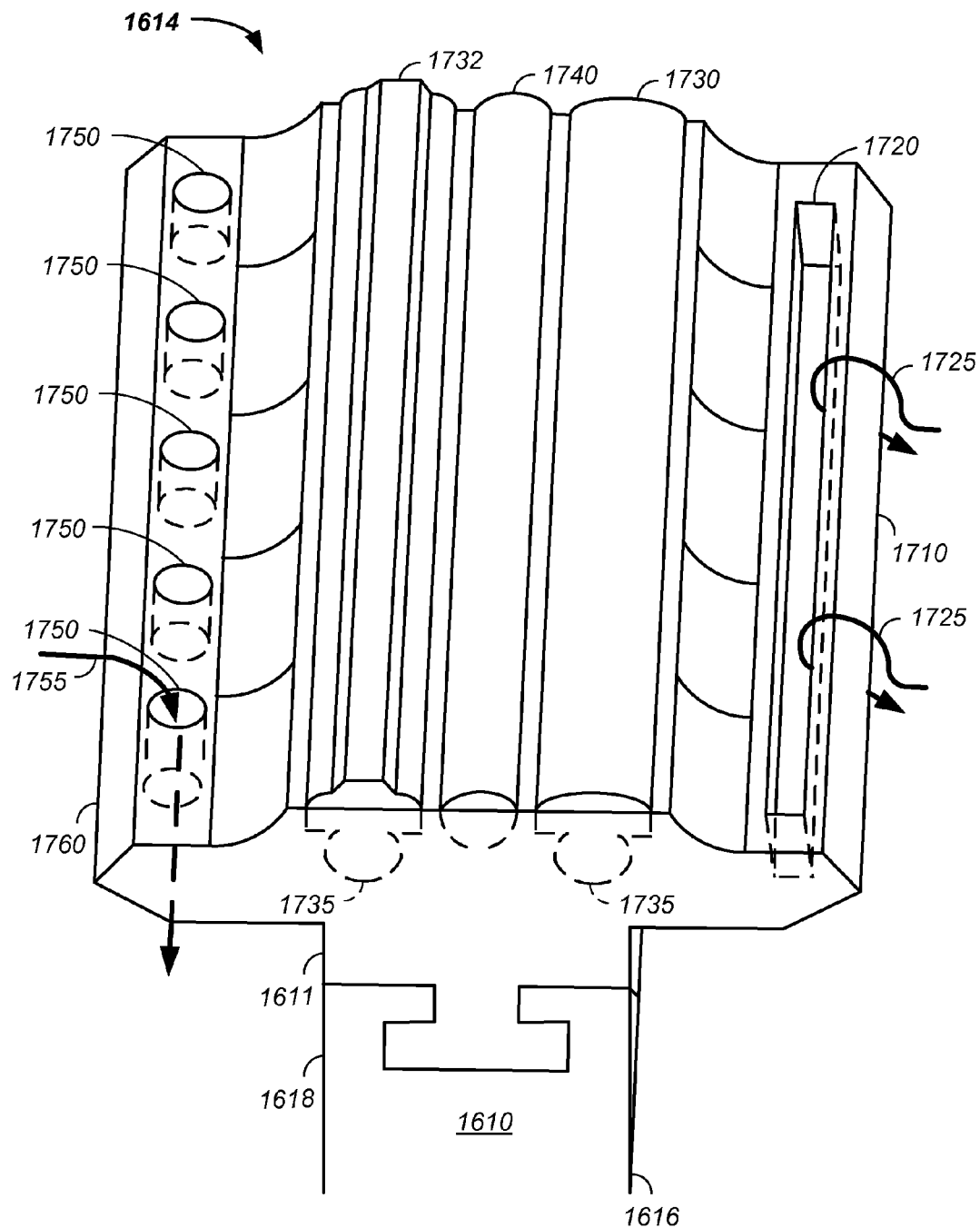
FIG. 17 illustrates a vane end.

Referring now to FIG. 17, the vane 450 optionally includes a replaceably attachable vane head 1611 attached to the vane body 1610. The replaceable vane head 1611 allows for separate machining and ready replacement of the vane wings 1620, 1630 and vane tip 1614 elements. Optionally the vane head 1611 hinges, snaps, or slides onto the vane body 1610.

Vane Caps/Vane Seals

Preferably vane caps, not illustrated, cover the upper and lower surface of the vane 450. For example, an upper vane cap cover the entirety of the upper z-axis surface of the vane 450 and a lower vane cap covers the entirety of the lower z-axis surface of the vane 450. Optionally the vane caps function as seals or seals are added to the vane caps.

Vane Movement

The vane 450 optionally slidingly moves along and/or within the rotor-vane chamber or rotor-vane slot 452. The edges of the rotor vane slot 452 function as guides to restrict movement of the vane along the y-axis. The vane movement moves the vane body, in a reciprocating manner, toward and then away from the housing inner wall 432. Referring now to FIG. 16A, the vane base 1612 of the vane 450 is illustrated at a fully retracted position into the rotor-vane channel 452 at a first time, $t_1$, and at a fully extended position at a second time, $t_2$.

Vane Wing-Tips

Herein vane wings or vane extensions are defined, which protrude or extend away from the vane body 1610 along the x-axis. Referring again to FIG. 16, certain elements are described for a leading vane wing 1620, that extends into the leading chamber 334 and certain elements are described for a trailing wing 1630, that extends into the expansion chamber 333. Any element described with reference to the leading vane wing 1620 is optionally applied to the trailing wing 1630. Similarly, any element described with reference to the trailing wing 1630 is optionally applied to the leading wing 1620. Further, the rotary engine 110 optionally runs clockwise, counter clockwise, and/or is reversible from clock-wise to counter clockwise rotation.

Still referring to FIG. 16, optional vane ends are illustrated. Optionally, one or more of a leading vane wing-tip 1620 and a trailing wing tip 1630 are added to the vane 450. The leading wing-tip 1620 extends from about the vane end 1614 into the leading chamber 334 and the trailing wing-tip 1630 extends from about the vane end 1614 into the trailing chamber or reference expansion chamber 333. The leading wing-tip 1620 and trailing wing-tip 1630 are optionally of any geometry. However, the preferred geometry of the wing-tips reduces chatter or vibration of the vane ends against the outer housing during operation of the engine. Chatter is unwanted opening and closing of the seal between expansion chamber 333 and leading chamber 334. The unwanted opening and closing results in unwanted release of pressure from the expansion chamber 333, because the vane 1614 is pushed away from the inner wall 432 of the housing, with resulting loss of expansion chamber 333 pressure and rotary engine 110 power.

In one example, the outer edge of the wing-tips 1620, 1630, proximate the inner wall 432, are progressively further from the inner wall 432 as the wing-tip extends away from the vane end 1614 along the x-axis. In another example, a distance between the inner edge of the wing-tip 1634 and the inner housing 432 decreases along a portion of the x-axis versus a central x-axis point of the vane body 1610. Some optional wing-tip shape elements include:

- an about perpendicular wing-tip bottom 1634 adjoining the vane body 1610;
- a curved wing-tip surface proximate the inner housing 432;
- an outer vane wing-tip surface extending further from the housing inner wall 432 with increasing x-axis or rotational distance from a central point of the vane end 1614;
- an inner vane wing-tip surface 1634 having a decreasing y-axis distance to the housing inner wall 432 with increasing x-axis or rotational distance from a central point of the vane end 1614; and a three, four, five, six, or more sided polygon perimeter in an x-, y-cross-sectional plane of an individual wing tip, such as the leading wing-tip 1620 or trailing wing-tip 1630.

Further examples of wing-tip shapes are illustrated in connection with optional wing-tip pressure elements and vane caps, described infra.

A t-shaped vane refers to a vane 450 having both a leading wing-tip 1620 and trailing wing-tip 1630.

Vane End Components

Referring now to FIG. 17, examples of optional vane end 1614 components are illustrated. Preferred vane end 1614 components include:
one or more bearings for bearing the centrifugal force of the vane 450 applied to the inner housing 420;
one or more seals for providing a seal between the leading chamber 334 and the expansion chamber 333;
one or more pressure relief cuts for reducing pressure build-up between the vane wings 1620, 1630 and the inner wall 432 of the housing; and
a booster enhancing pressure equalization above and below a vane wing.

Each of the bearings, seals, pressure relief cuts, and/or boosters are further described herein.

Bearings

The vane end 1614 optionally includes a roller bearing 1740. The roller bearing 1740 preferably takes a majority of the force of the vane 450 applied to the inner housing 432, such as fuel expansion forces and/or centrifugal forces. The roller bearing 1740 is optionally an elongated bearing or a ball bearing. An elongated bearing is preferred as the elongated bearing distributes the force of the vane 450 across a larger portion of the inner housing 432 as the rotor 440 turns about the shaft 220, which minimizes formation of a wear groove on the housing inner wall 432. The roller bearing 1740 is optionally one, two, three, or more bearings. Preferably, each roller bearing is spring loaded to apply an outward force of the roller bearing 1740 into the inner wall 432 of the housing. The roller bearing 1740 is optionally magnetic.

Seals

Still referring to FIG. 17, the vane end 1614 preferably includes one or more seals affixed to the vane 450. The seals provide a barrier between the leading chamber 334 and the expansion chamber 333. A first vane end seal 1730 example comprises a seal affixed to the vane end 1614, where the vane-seal includes a longitudinal seal running along the z-axis from about the top of the vane 1617 to about the bottom of the vane 1619. The first-vane seal 1730 is illustrated as having an arched longitudinal surface. A second vane end seal 1732 example includes a flat edge proximately contacting the housing inner wall 432 during use. Optionally, for each vane 450, one, two, three, or more vane seals are configured to provide proximate contact between the vane end 1614 and housing inner wall 432. Optionally, the vane-seals 1730, 1732 are fixedly and/or replaceably attached to the vane 450, such as by sliding into a groove in the vane-tip running along the z-axis. Preferably, the vane-seal comprises a plastic, fluoropolymer, flexible, and/or rubber seal material.

Pressure Relief Cuts

As the vane 450 rotates, a resistance pressure builds up between the vane end 1614 and the housing inner wall 432 that results in chatter. For example, pressure builds up between the leading wing-tip surface 1710 and the housing inner wall 432. Pressure between the vane end 1614 and housing inner wall 432 results in vane chatter and inefficiency of the engine.

The leading wing-tip 1620 optionally includes a leading wing-tip surface 1710. The leading wing-tip surface 1710, which is preferably an edge running along the z-axis, cuts, travels, and/or rotates through air and/or fuel in the leading chamber 334.

The leading vane wing-tip 1620 optionally includes: a cut, aperture, hole, fuel flow path, air flow path, and/or tunnel 1720 cut through the leading wing-tip along the y-axis. The cut 1720 is optionally one, two, three, or more cuts. As air/fuel pressure builds between the leading wing-tip surface 1710 or vane end 1614 and the housing inner wall 432, the cut 1720 provides a pressure relief flow path 1725, which reduces chatter in the rotary engine 110. Hence, the cut or tunnel 1720 reduces build-up of pressure, resultant from rotation of the engine vanes 450 about the shaft 220, proximate the vane end 1614. The cut 1720 provides an air/fuel flow path 1725 from the leading chamber 334 to a volume above the leading wing-tip surface 1710, through the cut 1720, and back to the leading chamber 334. Any geometric shape that reduces engine chatter and/or increases engine efficiency is included herein as possible wing-tip shapes.

Still referring to FIG. 17, the vane end 1614 optionally includes one or more trailing: cuts, apertures, holes, fuel flow paths, air flow paths, and/or tunnels 1750 cut through the trailing wing-tip 1630 along the y-axis. The trailing cut 1750 is optionally one, two, three, or more cuts. As fuel expansion pressure builds between the trailing edge tip 1750 or vane end 1614 and the housing inner wall 432, the cut 1750 provides a pressure relief flow path 1755, which reduces chatter in the rotary engine 110. Hence, the cut or tunnel 1750 reduces build-up of pressure, resultant from rotation of the engine vanes 450 about the shaft 220, proximate the vane end 1614. The cut 1750 provides an air/fuel flow path 1755 from the expansion chamber 333 to a volume above the trailing wing-tip surface 1760, through the cut 1750, and back to the trailing chamber 333. Any geometric shape that reduces engine chatter and/or increases engine efficiency is included herein as possible wing-tip shapes.

Vane Wing

Figure 18:
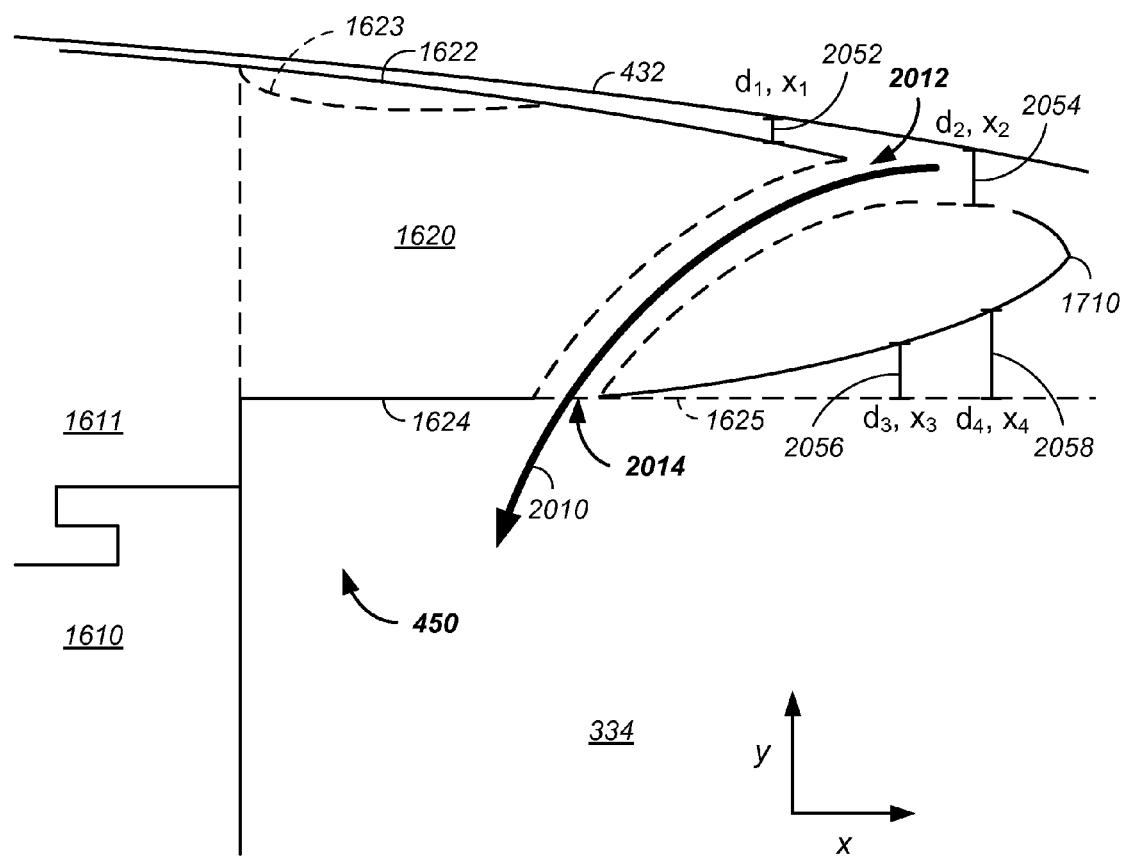
FIG. 18 illustrates a vane extension or wing.

Referring now to FIG. 18, a cross-section of the vane 450 is illustrated having several optional features including: a curved outer surface, a curved inner surface, and a curved tunnel, each described infra.

The first optional feature is a curved outer surface 1622 of the leading vane wing 1620. In a first case, the curved outer surface 1622 extends further from the inner wall of the housing 432 as a function of x-axis position relative to the vane body 1610. For instance, at a first x-axis position, $x_1$, there is a first distance, $d_1$, between the outer surface 1622 of the wing 1620 and the inner housing 432. At a second position, $x_2$, further from the vane body 1610, there is a second distance, $d_2$, between the outer surface 1622 of the wing 1620 and the inner housing 432 and the second distance, $d_2$, is greater than the first distance, $d_1$. Preferably, there are positions on the outer surface 1622 of the leading wing 1620 where the second distance, $d_2$, is about two, four, or six times as large as the first distance, $d_1$. In a second case, the outer surface 1622 of the leading wing 1620 contains a negative curvature section 1623. The negative curvature section 1623 is optionally described as a concave region. The negative curvature section 1623 on the outer surface 1622 of the leading wing 1620 allows the build-up 610 and the cut-outs 510, 520 in the housing as without the negative curvature 1623, the vane 450 mechanically catches or physically interferes with the inner wall of the housing 432 with rotation of the vane 450 about the shaft 220 when using a double offset housing 430.

The second optional feature is a curved inner surface 1624 of the leading vane wing 1620. The curved inner surface 1624 extends further toward the inner wall of the housing 432 as a function of x-axis position relative to the vane body 1610. Stated differently, the inner surface 1624 of the leading vane curves away from a reference line 1625 normal to the vane body at the point of intersection of the vane body 1610 and the leading vane wing 1620. For instance, at a third x-axis position, $x_3$, there is a third distance, $d_3$, between the outer surface 1622 of the wing 1620 and the reference line 1625. At a fourth position, $x_4$, further from the vane body 1610, there is a fourth distance, $d_4$, between the outer surface 1622 of the wing 1620 and the reference line 1625 and the fourth distance, $d_4$, is greater than the third distance, $d_3$. Preferably, there are positions on the outer surface 1622 of the leading wing 1620 where the fourth distance, $d_4$, is about two, four, or six times as large as the third distance, $d_3$.

The third optional feature is a curved fuel flow path 2010 running through the leading vane wing 1620, where the fuel flow path is optionally described as a hole, aperture, and/or tunnel. The curved fuel flow path 2010 includes an entrance opening 2012 and an exit opening 2014 of the fuel flow path 2010 in the leading vane wing 1620. The edges of the fuel flow path are preferably curved, such as with a curvature approximating an aircraft wing. A distance from the vane wing-tip 1710 through the fuel flow path 2010 to the inner surface at the exit port 2014 of the leading wing 1624 is longer than a distance from the vane wing-tip 1710 to the exit port 2014 along the inner surface 1624 of the leading wing 1620. Hence, the flow rate of the fuel through the fuel flow path 2010 maintains a higher velocity compared to the fuel flow velocity along the base 1624 of the leading wing 1620, resulting in a negative pressure between the leading wing 1620 and the inner housing 432. The negative pressure lifts the vane 450 toward the inner wall 432, which lifts the vane tip 1614 along the y-axis to proximately contact the inner housing 432 during use of the rotary engine 110. The fuel flow path 2010 additionally reduces unwanted pressure between the leading wing 1620 and inner housing 432, where excess pressure results in detrimental engine chatter.

Trailing Wing

Figure 19A:
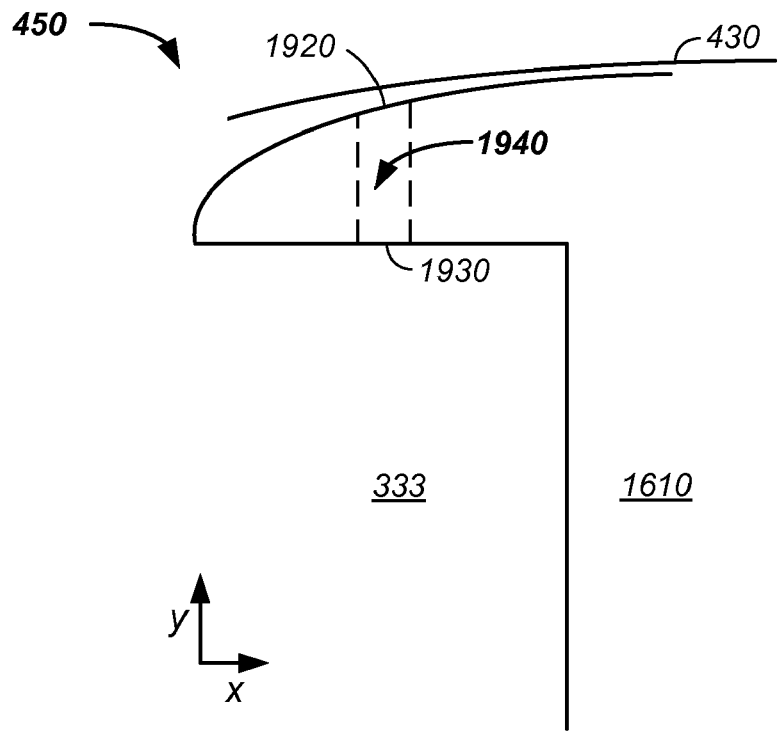
FIG. 19 illustrates a pressure relief cut in a vane extension or wing.

Referring now to FIG. 19, an example of a trailing cut 1750 in a vane 450 trailing wing 1630 is illustrated. For clarity, only a portion of vane 450 is illustrated. The trailing wing 1630 is illustrated, but the elements described in the trailing wing-tip 1630 are optionally used in the leading wing 1620. The optional hole or aperture 1750 leads from an outer area 1920 of the wing-tip to an inner area 1930 of the wing-tip. Referring now to FIG. 19A, a cross-section of a single hole 1940 having about parallel sides is illustrated. The aperture aids in equalization of pressure in an expansion chamber between an inner side of the wing-tip and an outer side of the wing-tip.

Still referring to FIG. 19A, a single aperture 1750 is illustrated. Optionally, a series of holes 1750 are used where the holes are separated along the z-axis. Optionally, the series of holes are connected to form a groove similar to the cut 1720. Similarly, groove 1720 is optionally a series of holes, similar to holes 1750.

Figure 19B:
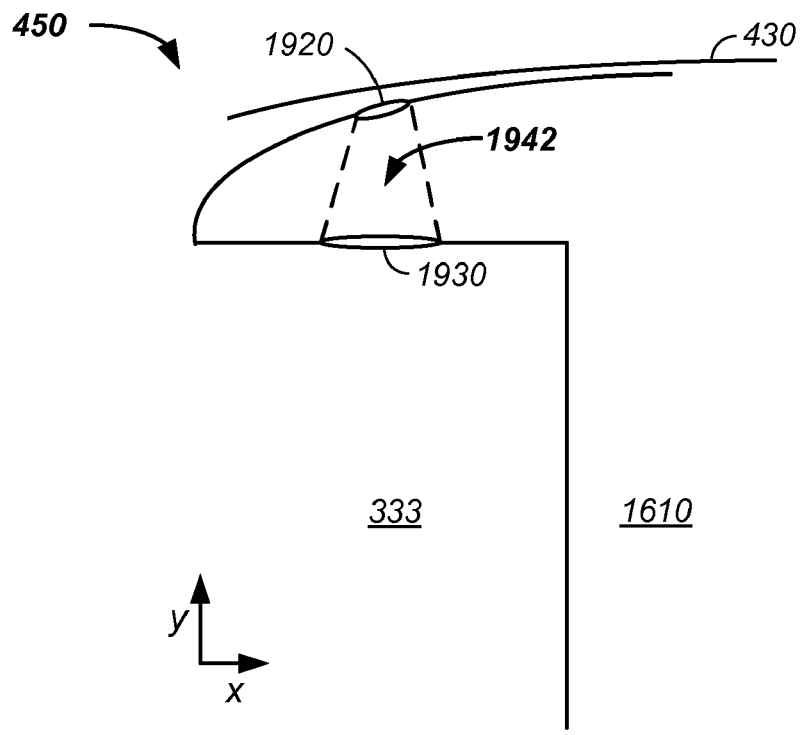

Referring now to FIG. 19B, a vane 450 having a trailing wing 1630 with an optional aperture 1942 configuration is illustrated. In this example, the optional aperture 1942 expands from a first cross-sectional distance at the outer area of the wing 1920 to a larger second cross-sectional distance at the inner area of the wing 1930. Preferably, the second cross-sectional distance is at least 1½ times that of the first cross-sectional distance and optionally about two, three, or four times that of the first cross-sectional distance.

Booster

Figure 20:
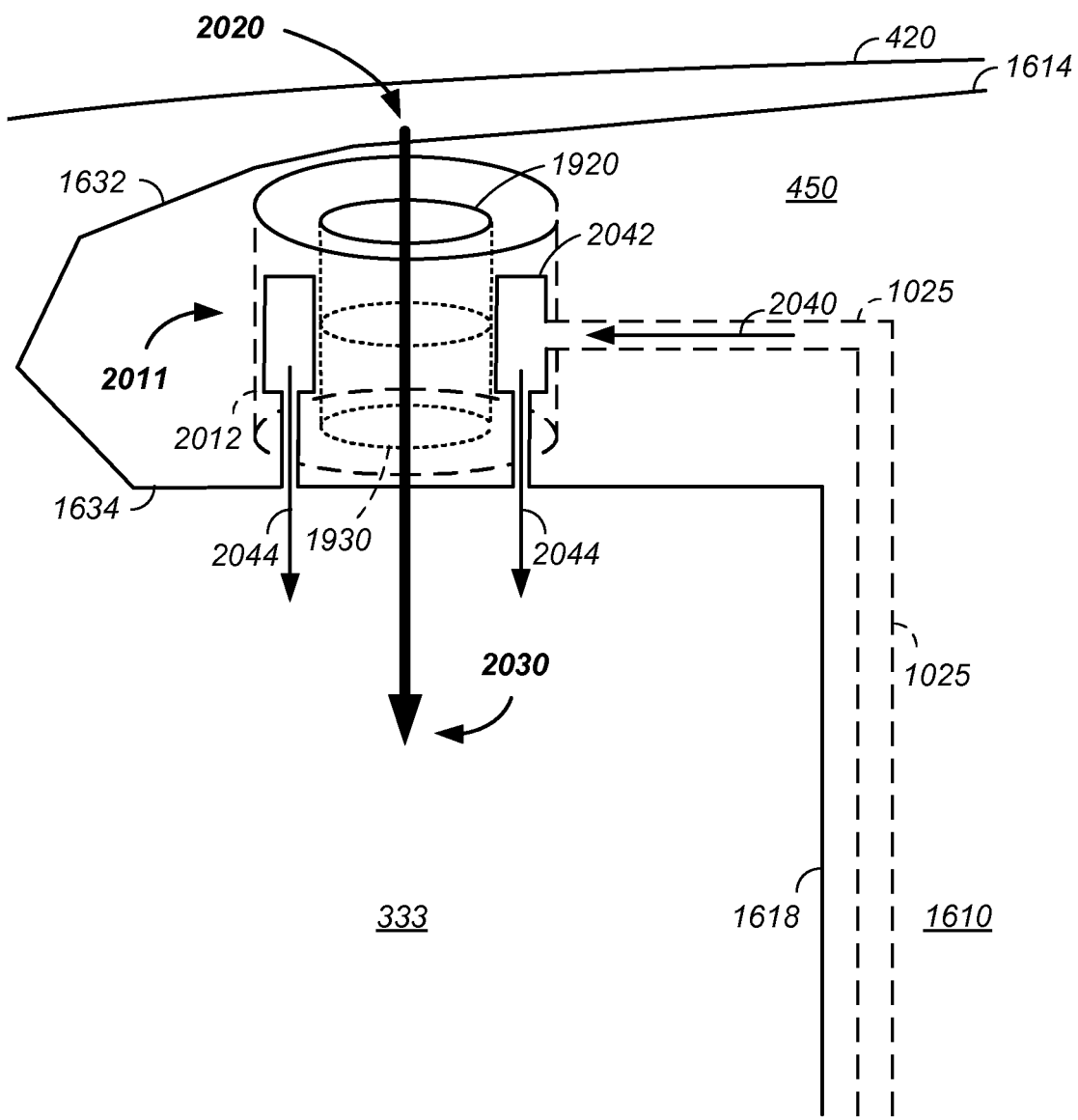
FIG. 20 illustrates a vane wing booster.

Referring now to FIG. 20, an example of a vane 450 having a booster 1300 is provided. The booster 1300 is applied in a vane booster 2011 configuration. The flow along the trailing pressure relief flow path 1755, is optionally boosted or amplified using flow through the vane conduit 1025. Flow from the vane conduit runs along a vane flow path 2040 to an acceleration chamber 2042 at least partially about the trailing flow path 1755. Flow from the vane conduit 1025 exits the trailing wing 1630 through one or more exit ports 2044. The flow from the vane conduit 1025 exiting through the exit ports 2044 provides a partial vacuum force that accelerates the flow along the trailing pressure relief flow path 1755, which aids in pressure equalization above and below the trailing wing 1630, which reduces vane 450 and rotary engine 110 chatter. Preferably, an insert 2012 contains one or more of and preferably all of: the inner area of the wing 1920, the outer area of the wing 1930, the acceleration chamber 2042, and exit port 2044 along with a portion of the trailing pressure relief flow path 1755 and vane flow path 2040.

Rotary Apparatus

In one configuration, a rotary apparatus includes: a rotor, a stator, and a vane, the vane configured to separate the rotor and the stator with the vane further including an element configured to roll, which is also referred to as a rolling element. In one example, the vane includes a vane tip proximate the housing or stator, where the rolling element couples to the vane tip. In another example, the vane includes a vane side where at least a portion of the vane side proximately contacts the rotor and where the rolling element couples to the vane side. In one case, the vane side includes a leading vane side proximate a leading expansion chamber. In a second case, the vane side is proximate a trailing expansion chamber.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. A rotary apparatus, comprising:
   a vane;
   a rotor comprising a center, said rotor configured to carry said vane; and
   a housing, said rotor operatively mounted within said housing,
   wherein said vane further comprises:
   a vane chamber face;
   a central vane axis extending longitudinally through said vane along a y-axis, the y-axis comprising a line from the center of said rotor to said housing; and
   a vane end, said vane end intersecting the y-axis, said vane end proximate an inner surface of said housing, said vane end of said vane further comprising:
   a vane extension protruded radially outward from about said vane end past said vane chamber face along an x-axis about perpendicular to the y-axis, said vane extension comprising an outer face proximate said housing and an inner face opposite said outer face, said vane extension comprising at least one aperture therethrough from said outer face of said vane extension to said inner face of said vane extension;
   a vane conduit configured to carry a fuel through a portion of said vane; and a vane fuel flow booster, said fuel flow booster configured to increase flow through said aperture using fuel flow through said vane conduit; and a rotationally trailing chamber between said rotor and said housing, the trailing chamber configured to rotationally follow said vane during operation of said rotary apparatus, said vane extension protruded into said rotationally trailing chamber.

2. The apparatus of claim 1, the aperture comprising a fuel flow path from a first portion of the rotationally trailing chamber at a first y-axis distance from said housing to a second portion of the rotationally trailing chamber at a second y-axis distance from said housing, the second distance greater than the first distance.

3. The apparatus of claim 2, said aperture further comprising:
an expanding cross-sectional area as a function of distance away from said housing.

4. The apparatus of claim 1, said vane conduit configured to carry fuel through at least a portion of said vane extension.

5. The apparatus of claim 1, further comprising:
a rotationally leading chamber between said rotor and said housing, the leading chamber configured to rotationally lead said vane during operation of said rotary apparatus, said vane extension protruded into said rotationally leading chamber.

6. The apparatus of claim 5, the aperture further comprising:
a curved pathway.

7. The apparatus of claim 5, the aperture comprising a fuel flow path from a first portion of the rotationally leading chamber at a first y-axis distance from said housing to a second portion of the rotationally leading chamber at a second y-axis distance from said housing, the second distance greater than the first distance.

8. The apparatus of claim 1, wherein the at least one aperture comprises a set of at least three fuel flow conduits.

9. The apparatus of claim 1, further comprising:
a first end plate positioned at a first end of said rotor; and
a second end plate positioned at a second end of said rotor,
the aperture extending further along a z-axis relative to extension of the aperture along the x-axis, the z-axis perpendicular to both the x-axis and the y-axis, the z-axis intersecting both said first end plate and said second end plate.

10. The apparatus of claim 1, wherein the at least one aperture comprises:
a first cut through a rotationally leading wing of said vane; and
a second cut through a rotationally trailing wing of said vane.

11. The apparatus of claim 10, wherein the first cut comprises a first geometric shape, wherein the second cut comprises a second geometric shape, the first geometric shape differing from the second geometric shape.

12. The apparatus of claim 1, said vane extension comprising:
an outer vane extension face comprising:
a first y-axis distance from said housing at a first x-axis distance from said vane face; and
a second y-axis distance from said housing at a second x-axis distance from said vane face, said second y-axis distance at least twice said first y-axis distance.

13. The apparatus of claim 12, said vane extension comprising:
an inner vane extension face comprising:
a third y-axis distance from said housing at a third x-axis distance from said vane face; and a fourth y-axis distance from said housing at a fourth x-axis distance from said vane face, said fourth y-axis distance less than said third y-axis distance.

14. A method for use of a rotary apparatus, comprising the steps of:
providing a vane;
carrying the vane with a rotor, said rotor comprising a center;
operatively mounting the rotor within a housing; and
rotating said rotor relative to said housing,
wherein said vane further comprises:
a vane chamber face;
a central vane axis extending longitudinally through said vane along a y-axis, the y-axis comprising a line from the center of said rotor to said housing; and
a vane end, said vane end intersecting the y-axis, said vane end proximate an inner surface of said housing, said vane end of said vane further comprising:
a vane extension protruded radially outward from about said vane end past said vane chamber face along an x-axis about perpendicular to the y-axis, said vane extension comprising an outer face proximate said housing and an inner face opposite said outer face, said vane extension comprising at least one aperture from said outer face of said vane extension to said inner face of said vane extension; and
providing a rotationally trailing chamber between said rotor and said housing, said step of rotating causing said trailing chamber to rotationally follow said vane during operation of said rotary apparatus, said vane extension protruded into said rotationally trailing chamber,
wherein the aperture comprises at least one of:
a fuel flow path from a first portion of the rotationally trailing chamber at a first y-axis distance from said housing to a second portion of the rotationally trailing chamber at a second y-axis distance from said housing, the second distance greater than the first distance
an expanding cross-sectional area as a function of distance away from said housing;
a set of at least three fuel flow conduits; and
operation as a portion of a fuel flow booster, said fuel flow booster using fuel carried through a portion of said vane to increase fuel flow through the aperture.

15. The method of claim 14, further comprising the step of:
providing a rotationally leading chamber between said rotor and said housing, said step of rotating causing said leading chamber to rotationally lead said vane during operation of said rotary apparatus, said vane extension protruded into said rotationally leading chamber,
wherein the aperture comprises at least one of:
a curved pathway; and
a fuel flow path from a first portion of the rotationally leading chamber at a first y-axis distance from said housing to a second portion of the rotationally leading chamber at a second y-axis distance from said housing, the second distance greater than the first distance.

16. The method of claim 14, wherein the at least one aperture comprises:
a first cut through a rotationally leading wing of said vane; and
a second cut through a rotationally trailing wing of said vane.

17. The method of claim 14, further comprising the step of:
reducing pressure between a portion of said vane extension and said housing as a result of fuel flowing through the aperture.

* * * * *